(12) United States Patent
Miyai et al.

(10) Patent No.: US 6,960,790 B2
(45) Date of Patent: Nov. 1, 2005

(54) FINGERPRINT DETECTION DEVICE AND METHOD OF ITS MANUFACTURE, AND APPARATUS FOR FORMING A PROTECTIVE FILM

(75) Inventors: Seiichi Miyai, Kanagawa (JP); Shuichi Oka, Kanagawa (JP)

(73) Assignee: Sony Corporation, Tokyo (JP)

( * ) Notice: Subject to any disclaimer, the term of this patent is extended or adjusted under 35 U.S.C. 154(b) by 201 days.

(21) Appl. No.: 10/222,469

(22) Filed: Aug. 16, 2002

(65) Prior Publication Data
US 2004/0185590 A1 Sep. 23, 2004

(30) Foreign Application Priority Data
Aug. 21, 2001 (JP) ............................ P2001-250607

(51) Int. Cl.[7] ........................................ H01L 31/0312
(52) U.S. Cl. ........................................ 257/77; 257/914
(58) Field of Search ............................ 257/77, 78, 249, 257/678, 679, 680, 684, 778, 914, 922

(56) References Cited

U.S. PATENT DOCUMENTS

| | | | |
|---|---|---|---|
| 5,731,046 A * | 3/1998 | Mistry et al. | 427/553 |
| 6,067,368 A * | 5/2000 | Setlak et al. | 382/124 |
| 6,578,436 B1 * | 6/2003 | Ganapathi et al. | 73/862.046 |
| 6,579,833 B1 * | 6/2003 | McNallan et al. | 508/100 |

* cited by examiner

*Primary Examiner*—David Nhu
(74) *Attorney, Agent, or Firm*—Robert J. Depke; Trexler, Bushnell, Giangiorgi, Blackstone & Marr

(57) ABSTRACT

A fingerprint detection device has a fingerprint sensor chip and a diamond-like carbon (DLC) film covering the outermost surface of the sensor chip. The DLC film provides sufficient strength and enhanced electrostatic discharge withstand voltage to the fingerprint sensor chip. Thus, the DLC film protects the fingerprint sensor chip without any conventional protective cover. The DLC film is less scratchable and less stainable. Since the fingerprint detection device has no protective cover, the device can be provided in a thin and compact form. In addition, the device has high reliability.

9 Claims, 17 Drawing Sheets

F I G. 2
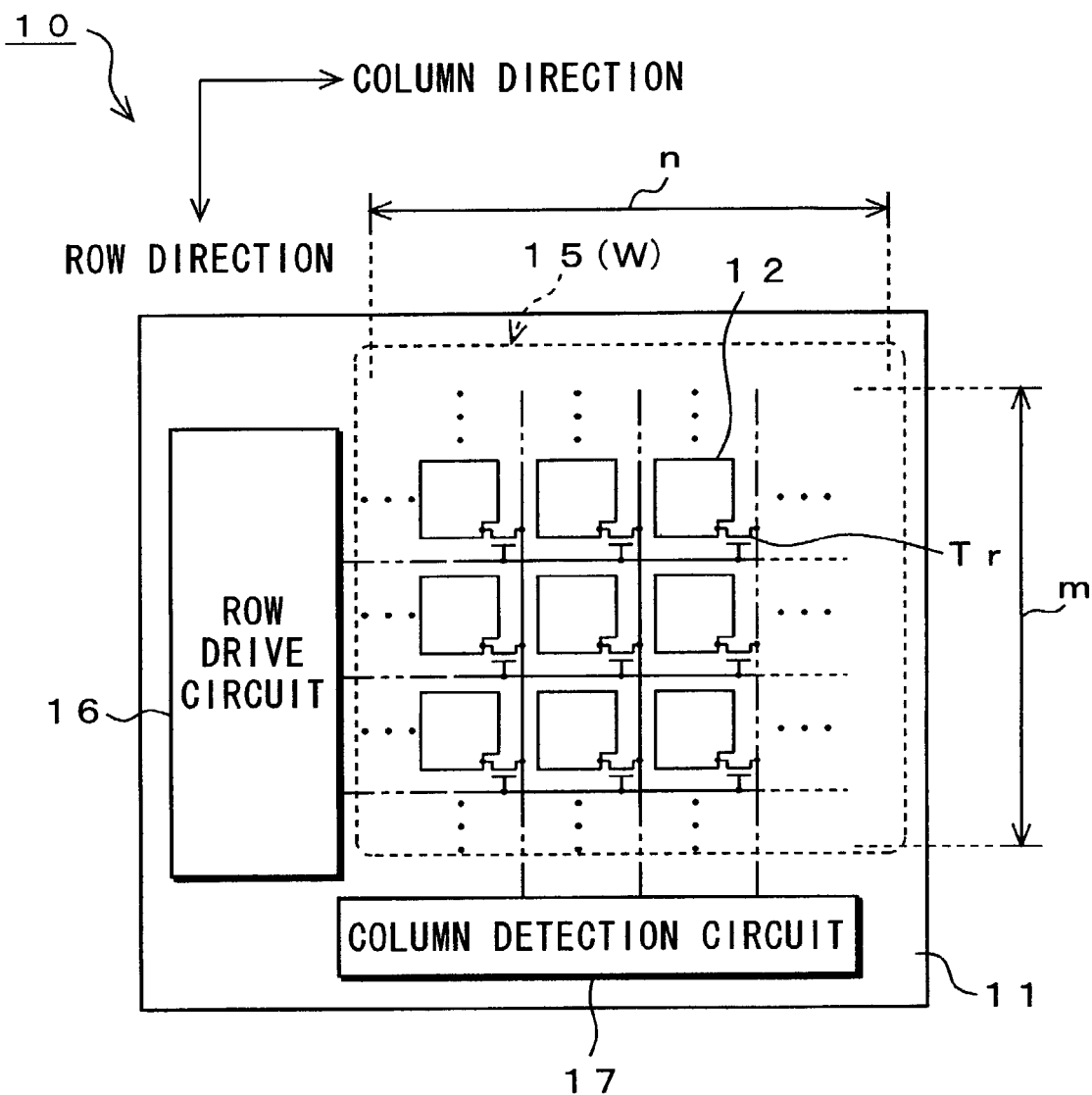

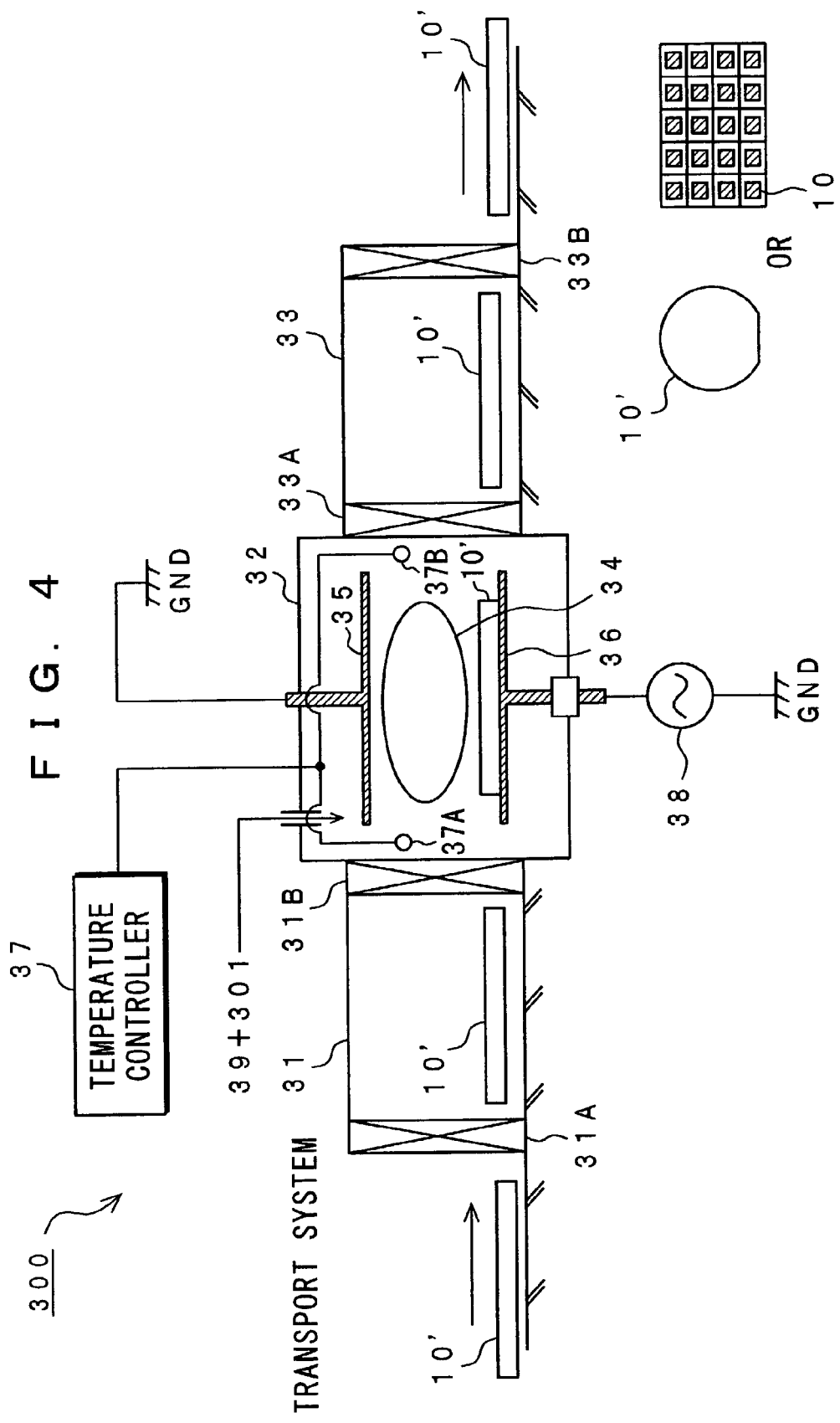

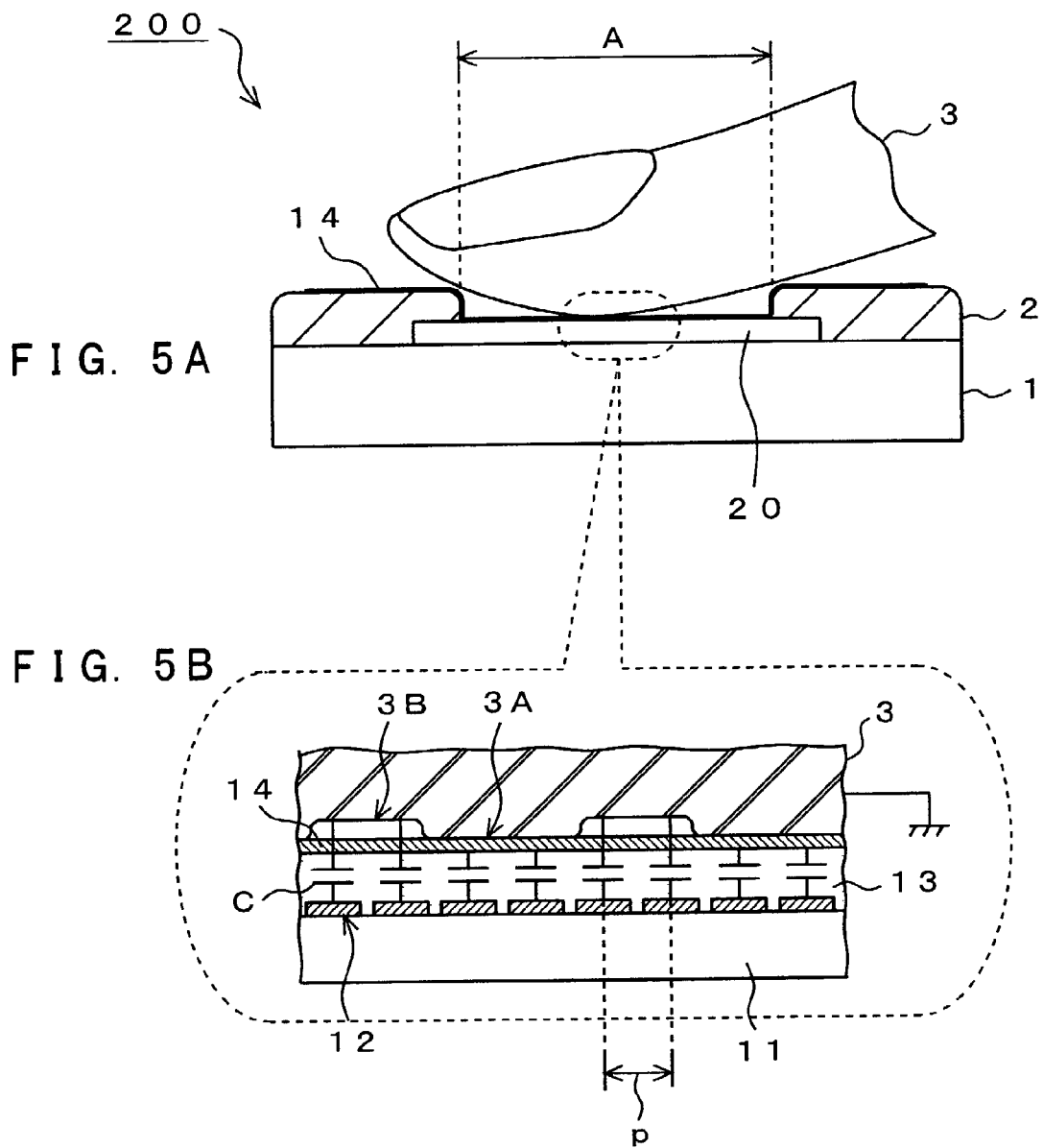

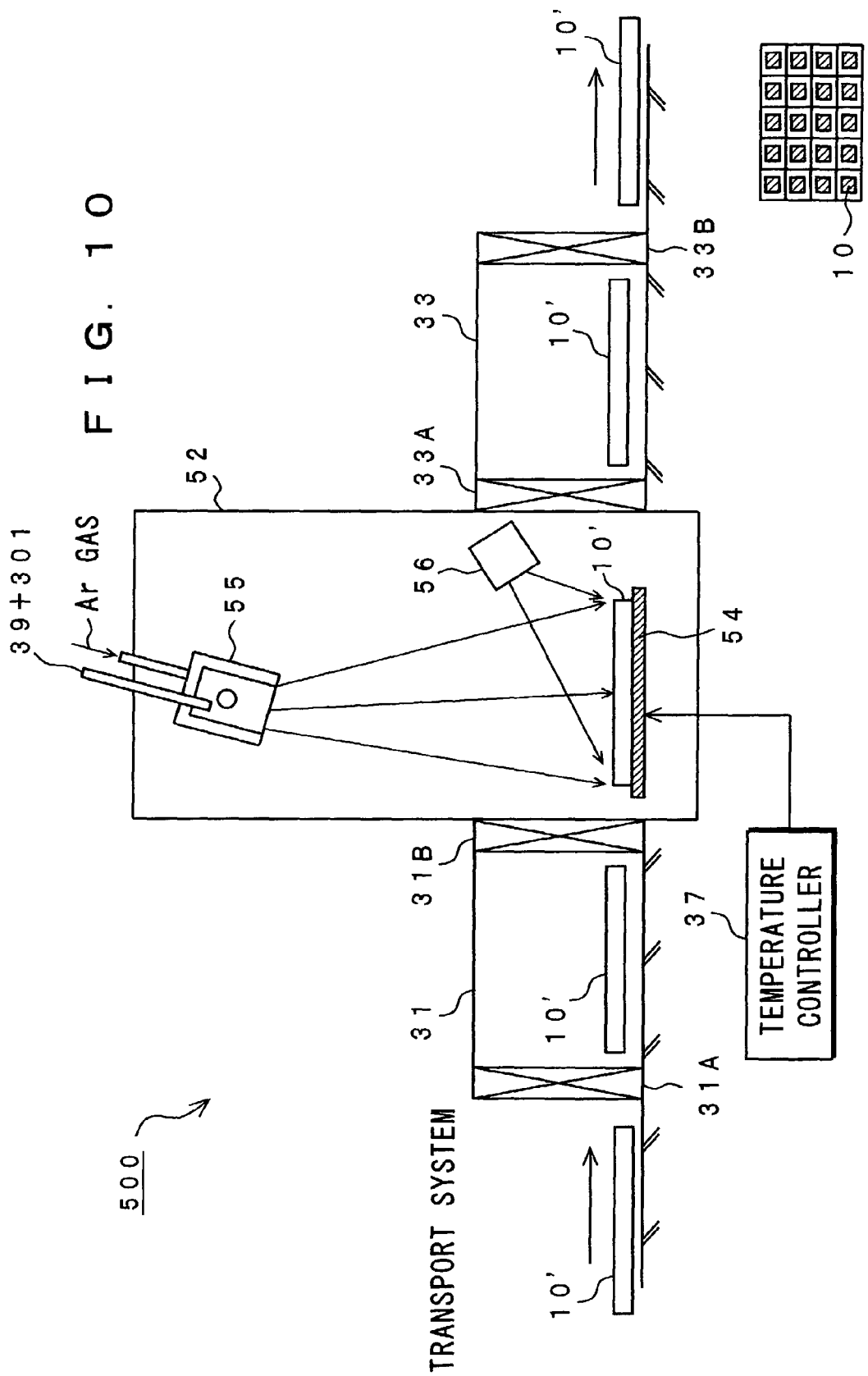

F I G. 13

| SAMPLES | | FILM THICKNESS μm | MATERIAL | HARDNESS GPa | SCRATCH TEST | WITHSTAND VOLTAGE |
|---|---|---|---|---|---|---|
| EMBODIMENT | ① | 0.5 | METHANE | >20 | ○ | GOOD |
| | ② | 1.0 | METHANE | >20 | ○ | GOOD |
| | ③ | 1.5 | METHANE | >20 | ◎ | GOOD |
| | ④ | 2.0 | METHANE | >20 | ◎ | GOOD |
| | ⑤ | 2.0 | METHANE + HYDROGEN | >20 | ◎ | GOOD |
| | ⑥ | 2.0 | METHANE + NITROGEN | >20 | ○ | GOOD |
| | ⑦ | 2.0 | ETHYLENE | >20 | ○ | GOOD |
| | ⑧ | 2.0 | ETHYLENE + HYDROGEN | >20 | ○ | GOOD |
| | ⑨ | 2.0 | ETHYLENE + NITROGEN | >20 | ○ | GOOD |
| COMPARATIVE EXAMPLE | ① | 2.0 | Si + N | 10 | — | GOOD |
| | ② | 0.1 | METHANE | >20 | NG | GOOD |

FINGERPRINT DETECTION DEVICE AND METHOD OF ITS MANUFACTURE, AND APPARATUS FOR FORMING A PROTECTIVE FILM

This application claims priority to Japanese Patent Application Number JP2001-250607 filed Aug. 21, 2001 which is incorporated herein by reference.

BACKGROUND OF THE INVENTION

1. Field of the Invention

The invention relates to a fingerprint detection device and a method of its manufacture. More particularly, the invention relates to a fingerprint detection device having a semiconductor chip for detecting a fingerprint (hereinafter referred to as fingerprint detectable semiconductor chip), the outermost upper surface of the semiconductor chip covered with a protective film of a carbon based material (the protective film hereinafter referred to as carbon based protective film) which can enhance the intensity of the surface and the electrostatic discharge withstand voltage of the semiconductor chip without any protective cover. The invention also relates to an apparatus for forming such protective film.

2. Description of the Related Art

In recent years, there are many occasions in banks and government offices for example where a fingerprint detection device is used to identify a person, to allow operation of an electronic device, and to authorize entrance to a specific facility.

Fingerprint detection devices for such uses as mentioned above have sense electrodes arranged in a grid on a semiconductor substrate and a protective film for covering the surface of the sense electrodes. These semiconductor chips are also called fingerprint sensor chips. When a finger is placed on the protective film, condensers are formed between a surface of the finger and the sense electrodes, with the protective film serving as a dielectric. The capacitance, and hence the voltage of each of these condensers vary from point to point, in accordance with the protrusions and recesses, i.e. ridges and troughs, of the fingerprint. Thus, by detecting the voltage distribution, a pattern indicative of the fingerprint can be detected (see, for example, U.S. Pat. No. 5,325,447).

In order to permit a finger to directly touch the surface of the semiconductor chip of the fingerprint detection device, the surface of the chip must be exposed. Therefore, the protective film must have strength to withstand such physical attack as scratching by fingers, nails, coins, pencils and the like. Besides the strength against such physical attacks as mentioned above, the protective film is also required to have resistance against static electricity. In addition, the capacitances must be easily detected. Specifically, the protective film is required to have a small friction coefficient, good hardness, high dielectric breakdown strength, high melting point, high thermal conductivity, small thermal expansion coefficient, and large specific dielectric constant.

In conventional fingerprint detection devices, a silicon nitride film is formed on the outermost surface of the semiconductor chip. The silicon nitride film serves as a protective film and dielectric layer of a respective condenser.

However, silicon nitride film has hardness on the order of 9–10 GPa, which is not hard enough to be a scratch-proof protective film. In order to avoid exposing the fingerprint detectable semiconductor chip (also hereinafter referred to as semiconductor chip), a metal cover is commonly used to protect the semiconductor chip. However, such cover that must be opened and closed each time is, at least mentally, unfavorable. Moreover, opening/closing mechanism of the cover hinders fabrication of a fingerprint detection device in a thin and/or compact form, and also hinders reduction of the manufacturing cost.

This is a serious problem especially when a fingerprint detection device is mounted on a portable electronic apparatus for enhancing its personal identification function.

SUMMARY OF THE INVENTION

The present invention is directed to solve these problems as mentioned above by providing an improved fingerprint detection device that has sufficient surface strength and electrostatic discharge withstand voltage without any cover. The invention is also directed to a method of manufacturing such fingerprint detection device and an apparatus for forming a protective film therefor.

The above mentioned problems is solved by a fingerprint detection device of the invention, which comprises a fingerprint detectable semiconductor chip and a carbon based protective film formed on the outermost surface of the semiconductor chip.

One might think that a diamond film or an amorphous diamond film could be used as a hard protecting film. However, they cannot be applied to the fingerprint detection device since diamond film is formed at a temperature in the range from 800 to 1000° C., far above the melting point of aluminum lead wires used in the fingerprint detection device.

The inventors of the present invention therefore have sought for a proper material for the protective film and successfully found a diamond-like carbon (hereinafter referred to as DLC) film that can be formed on a surface of the semiconductor chip at a temperature between about room temperature and 300° C.

Therefore, in accordance with one aspect of the invention, there is provided a first fingerprint detection device comprising a fingerprint detectable semiconductor chip and a protective DLC film formed on the outermost surface of the fingerprint detectable semiconductor chip.

Thus, the strength of the surface and the electrostatic discharge withstand voltage of the fingerprint detectable semiconductor chip can be improved without any cover. Moreover, the DLC film prevents the surface from being scratched and stained. Since a conventional protective cover is not needed, the fingerprint detection device can be given in a thin and compact form. The device also acquires high reliability.

In accordance with another aspect of the invention, there is provided a second fingerprint detection device comprising a substrate, a fingerprint detectable semiconductor chip formed on the substrate and having a fingerprint detection area, an insulating film formed on the entire upper surfaces of the substrate and the semiconductor chip, and a carbon based protective film. The insulating film has a window section defining the fingerprint detection area. The protective film is formed over the entire area on the semiconductor chip in the window section and on insulating film on a peripheral area of the window section.

In the second fingerprint detection device, because a carbon based protective film is covered over the entire area of the semiconductor chip in the window section defining the fingerprint detection area and also on insulating film on a peripheral of the window section, the strength of the surface and the electrostatic discharge withstand voltage of the fingerprint detectable semiconductor chip can be improved without any protective cover. Particularly, the carbon based protective film also reinforces the insulating film on a periphery of the window section. This permits provision of a further reliable fingerprint detection device.

In accordance with a further aspect of the invention, there is provided a first method of manufacturing a fingerprint detection device. The method comprises steps of forming circuit electrode for detecting a fingerprint (referred to as sense electrodes) on a semiconductor substrate, forming an insulating film on the surfaces of the semiconductor substrate and the circuit electrode, and forming a carbon based protective film on the insulating film.

In the first method of manufacturing a fingerprint detection device, the strength of the surface and the electrostatic discharge withstand voltage of the semiconductor chip are improved without any protective cover, which enables production of a highly reliable fingerprint detection device.

In accordance with a still further aspect of the invention, there is provided a second method of manufacturing a fingerprint detection device. The method comprises steps of forming a fingerprint detectable semiconductor chip on a substrate, forming an insulating film on the surfaces of the semiconductor substrate and the semiconductor chip, selectively removing a section of the insulating film lying on the semiconductor chip and exposing the semiconductor chip to form a window section for detecting a fingerprint, and forming a carbon based protective film at least over the entire area on the semiconductor chip inside the window section and on the insulating film on a peripheral area of the window section.

In the second method of manufacturing a fingerprint detection device, the strength of the surface and the electrostatic discharge withstand voltage of the semiconductor chip can be also improved without any protective cover. Particularly, the carbon based protective film also reinforces the insulating film on a periphery of the window. This permits manufacturing a reliable fingerprint detection device. It is noted that a step of processing a protective film for the surface can be omitted.

In accordance with a still further aspect of the invention, there is provided a first apparatus for forming a protective film. The apparatus grows a DLC film on a specimen. The apparatus comprises a processing container for accommodating therein the specimen, means for controlling the temperature in the processing container to keep the temperature of the specimen at a desired temperature, and a plasma generator for generating a desired plasma in the processing container kept at the desired temperature. The apparatus is adapted to introduce thereinto carbon and hydrogen to grow the DLC film on a surface of the specimen in a desired plasma atmosphere at the desired temperature. The apparatus is also adapted to introduce thereinto carbon, hydrogen and nitrogen.

With the first apparatus for forming a protective film according to the invention, a DLC film can be formed to a predetermined thickness on a substrate of, for example, a fingerprint detectable semiconductor chip at any low temperature below 200° C., typically at room temperature.

In accordance with a further aspect of the invention, there is provided a second apparatus for forming a protective film. The apparatus is adapted to introduce thereinto carbon and hydrogen and grows a DLC film on a surface of specimen. The apparatus is also adapted to introduce thereinto carbon, hydrogen and nitrogen. The apparatus comprises a processing container for accommodating therein the specimen, means for controlling the temperature of the specimen in the processing container to keep the temperature of the specimen at a desired temperature, a first ion gun for ionizing a carrier gas introduced into the processing container kept at the desired temperature and allowing the ionized carrier gas to be irradiated onto a surface of the specimen, and a second ion gun for regulating the scattering of the ionized carrier gas carried to the surface of the specimen by the first ion gun. The first ion gun ionizes the carrier gas and the carrier gas thus ionized leads carbon and hydrogen in addition to nitrogen each introduced into the processing container to the surface of specimen. The second ion gun is adapted to control the thickness of the DLC film.

With the second apparatus for a protective film according to the invention, a DLC film having a predetermined thickness can be also formed on a substrate of, for example, a fingerprint detectable semiconductor chip at any low temperature below 200° C.

In accordance with a further aspect of the invention, there is provided a third apparatus for forming a protective film. The apparatus grows a DLC film on a specimen. The apparatus comprises a processing container for accommodating therein the specimen, means for controlling the temperature of the specimen in the processing container to keep the temperature of the specimen at a desired temperature, a plasma generator for generating high-frequency ion plasma in the processing container kept at the desired temperature, and a carbon material placed inside the processing container accommodating the ionized plasma generated by the plasma generator. The DLC film is grown on the surface of the specimen by impinging ion generated by the high-frequency ion plasma onto the carbon material in the processing container in the desired atmosphere at the desired temperature.

With the third apparatus for forming a protective film according to the invention, a DLC film having a predetermined thickness can be also formed on a substrate of, for example, a fingerprint detectable semiconductor chip at any temperature below 200° C.

In accordance with a still further aspect of the invention, there is provided a fourth apparatus for forming a protective film. The apparatus grows a DLC film on a specimen. The apparatus comprises a processing container for accommodating therein a specimen, means for controlling the temperature of the specimen in the processing container to keep the temperature of the specimen at a desired temperature, a carbon material placed inside the processing container kept at the desired temperature, a first ion gun for allowing ion to impinge on the carbon material, and a second ion gun for regulating the scattering of carbon carried to the surface of the specimen by the first ion gun. The first ion gun impinges the ion on the carbon material in the desired atmosphere at the desired temperature in the processing container and the second ion gun controls the thickness of the DLC film.

With the fourth apparatus for forming a protective film according to the invention, a DLC film having a predetermined thickness can be also formed on a substrate of, for example, a fingerprint detectable semiconductor chip at any low temperature below 200° C.

The concluding portion of this specification particularly points out and distinctly claims the subject matter of the present invention. However those skill in the art will best understand both the organization and method of operation of the invention, together with further advantages and objects thereof, by reading the remaining portions of the specification in view of the accompanying drawings wherein like reference characters refer to like elements.

BRIEF DESCRIPTION OF THE DRAWINGS

FIG. 2 is a plan view of a fingerprint sensor chip 10 of FIG. 1A;

FIG. 4 is a block diagram representation of a first embodiment of an apparatus 300 for forming DLC film according to the invention;

FIG. 5A is a side elevation view of a second embodiment of a fingerprint detection device 200 according to the invention;

FIG. 5B is an enlarged cross sectional view of a portion of the fingerprint detection device 200;

FIG. 10 is a block diagram representation of a second embodiment of an apparatus 500 for forming DLC film according to the invention;

FIG. 13 is a table listing reliability assessments of DLC films 14, along with material, film thickness, and hardness of respective DLC film;

DETAILED DESCRIPTION OF PREFERRED EMBODIMENTS

Referring to the accompanying drawings, preferred embodiments of a fingerprint detection device, methods of its manufacture, and an apparatus for forming a DLC film according to the invention will now be described in detail.

(1) First Embodiment

Figures 1A, 1B:
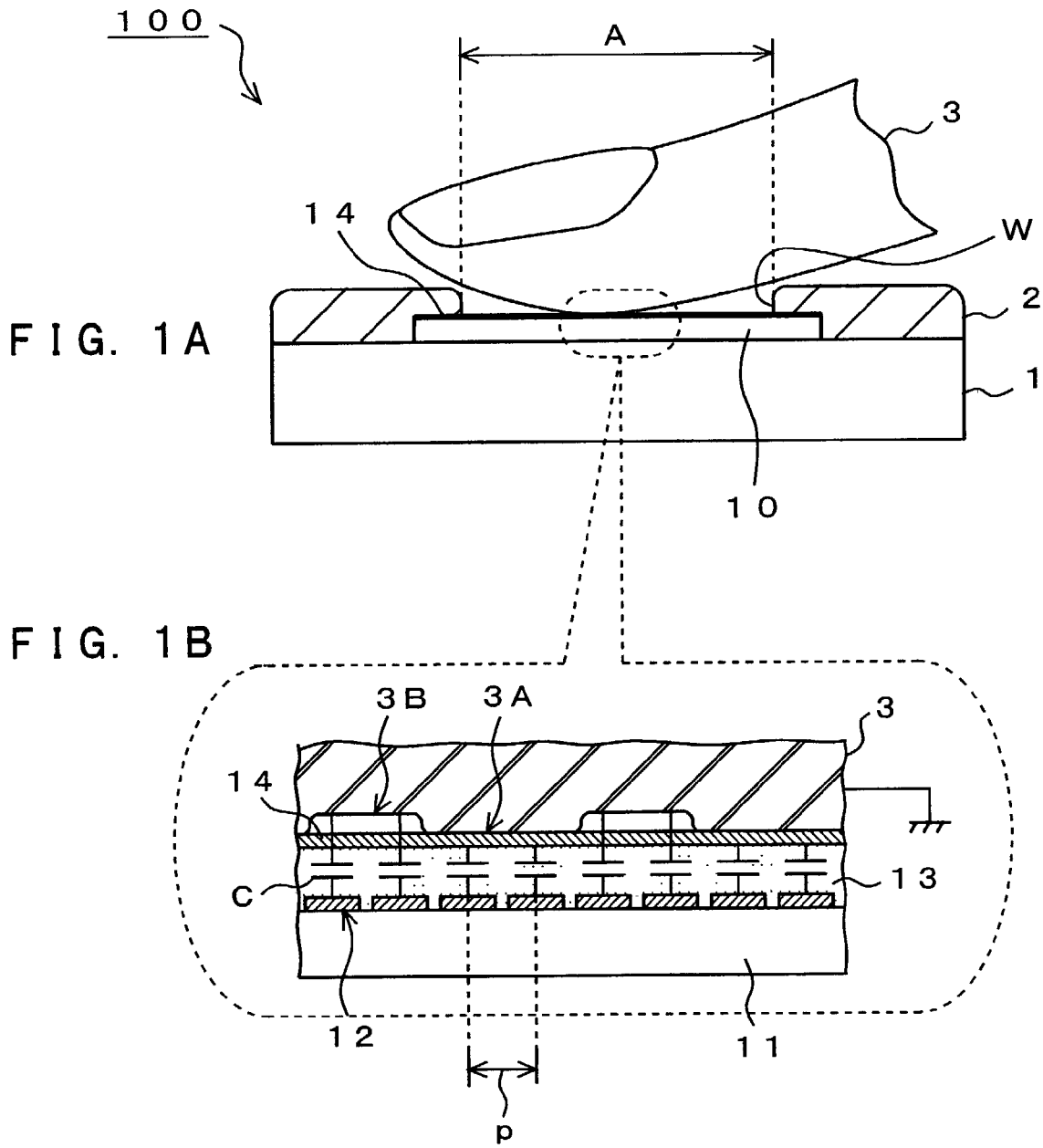
FIG. 1A is a side elevation view of a first embodiment of a fingerprint detection device 100 according to the invention.
FIG. 1B is an enlarged cross sectional view of a portion of the fingerprint detection device 100.

FIGS. 1A and 1B respectively show a side elevation view of a first embodiment of a fingerprint detection device and an enlarged cross sectional view of a portion thereof according to the invention. In this embodiment, the protective DLC film is formed on the outermost surface of the fingerprint detectable semiconductor chip so that the strength of the surface and the electrostatic discharge withstand voltage of a fingerprint detectable semiconductor chip are improved without any protective cover.

A fingerprint detection device 100 shown in FIG. 1A as the first embodiment is designed to detect a fingerprint of person, comprising a fingerprint detectable semiconductor chip (hereinafter referred to as fingerprint sensor chip) 10 formed on a substrate 1. A carbon based protective film 14 is deposited on the outermost surface of the fingerprint sensor chip 10. The fingerprint sensor chip 10 has a fingerprint detection area A. The peripheral section of the protective film 14 is securely held by an insulating film 2 which covers the entire area of the substrate 1 except for a window section W defining the fingerprint detection area A. Thus, the window section W is defined by an opening formed in the insulating film 2.

The carbon based protective film 14 is provided on the outermost surface of the fingerprint sensor chip 10, considering that: the fingerprint detection device 100 is configured such that it can be touched by a finger 3; the protective film 14, when placed on the sensor chip 10 and not exposing it, allows it to be resistant to collisions with a finger 3, nails, coins and pencils and the like; the protective film 14 withstands electrostatic stresses; and the changes in capacitance must be easily detected.

The DLC is used as the carbon based protective film 14. DLC has characteristics such as small friction coefficient, fair hardness, high dielectric breakdown voltage, high melting point, high thermal conductivity, small thermal expansion coefficient, and large specific inductive capacity.

In the embodiment shown herein, the DLC film has a thickness in the range from 0.2 to 0.5 micrometers, preferably in the range from 0.5 and 2.0 micrometers. It has been found by the inventors that the DLC film of less than 0.5 micrometers in thickness do not have sufficient protective power, while the film of 5 micrometers or greater in thickness are susceptible to a fracture due to their internal stress. The hardness of the DLC is at least 10 GPa (Giga Pascal), preferably on the order of 20 GPa.

In the embodiment shown herein, the DLC is made from carbon and hydrogen in one approach, and from carbon, hydrogen and nitrogen in another approach. In either approach, the DLC thus obtained has a tetrahedral structure, i.e. the diamond structure.

Ordinary diamond belongs to a stable group of cubic systems, in which carbon atoms occupy apices of a tetrahedron, sharing electrons in the SP3 orbits, thereby forming a three dimensional structure. DLC has such a diamond structure, but it has some carbons replaced by hydrogen atoms and/or nitrogen atoms. DLC has hardness close to that of diamond, and can be manufactured in the form of a film.

Underlying the DLC film in the form of a protective film 14 (the film hereinafter denoted by the same reference numeral) is a fingerprint sensor chip 10, which has a multiplicity of sense electrodes 12 formed on a semiconductor substrate 11 to serve as charge condensing electrodes of condensers C, as shown in FIG. 1B. The pitch p of the electrodes 12 is about 80 micrometers.

Lying over the sense electrodes 12 is an insulating film 13 of silicon nitride, for example. The insulating film 13 works as dielectric layers of the condensers C on one hand, and on the other hand works as a layer guarding the sense electrodes 12 from a finger. The protective DLC film 14 is formed to cover the insulating film 13.

A principle of detecting a fingerprint, using the fingerprint sensor chip 10, will be described below. FIG. 2 is a plan view showing a constitution of the fingerprint sensor chip 10.

In the fingerprint sensor chip 10, the sense electrodes 12 are arrange in a row and column array or matrix on the semiconductor substrate 11, with each row having m sense electrodes and each column having n sense electrodes, as shown in FIG. 2. This arrangement is referred to as sense electrode array 15. Each of the sense electrodes 12 is connected to a field effect transistor Tr (hereafter simply referred to as transistor) for switching. There are 3×3 sense electrodes 12 and associated transistors Tr shown in FIG. 2. In the example shown herein, each of the sense electrodes sense electrodes 12 is connected to the source of the associated transistor Tr.

Provided on the left side of the sense electrode array 15 is a row drive circuit 16, which is connected to the respective gates of the transistors Tr such that the row drive circuit 16 can simultaneously select all the gates in one column. Provided below the sense electrode array 15 is a column detection circuit 17, which is connected to the respective drains of the transistors Tr such that the column detection circuit 17 can scan the sense electrodes 12 in the direction of columns.

If a human finger 3 is placed on the window section W of the fingerprint sensor chip 10 as shown in FIG. 1A, condensers C are formed between the finger (i.e. the ridges and troughs constituting the fingerprint) and the respective sense electrodes 12. The condensers C has locally varying capacitances in accordance with the associated ridges and troughs. Thus, the condensers C are formed between the finger 3 serving as a common grounded electrode and the respective sense electrodes 12 of the fingerprint sensor chip 10, intervened by DLC film 14 and an insulating film 13 as dielectric, or by air layer, DLC film 14, and the insulating film 13 as dielectric.

For example, when the air layer disappears in a ridge 3A of the fingerprint and the distance between the finger and the corresponding electrode 12 becomes short, the capacitance of the condensers C becomes large. On the other hand, in the trough region 3B of the fingerprint, the air layer appears and the capacitance thereof also appears in series. Consequently, the distance between the finger and the sense electrodes 12 become increased, thereby decreasing the capacitance of the condensers C accordingly. Thus, by detecting the capacitance variation in the condensers C in the fingerprint detection area A, the fingerprint pattern can be well reproduced. The fingerprint pattern thus obtained may be used to identify the person by displaying it on a monitor, comparing it with a reference image previously obtained of the fingerprint or the like.

Figure 3A:
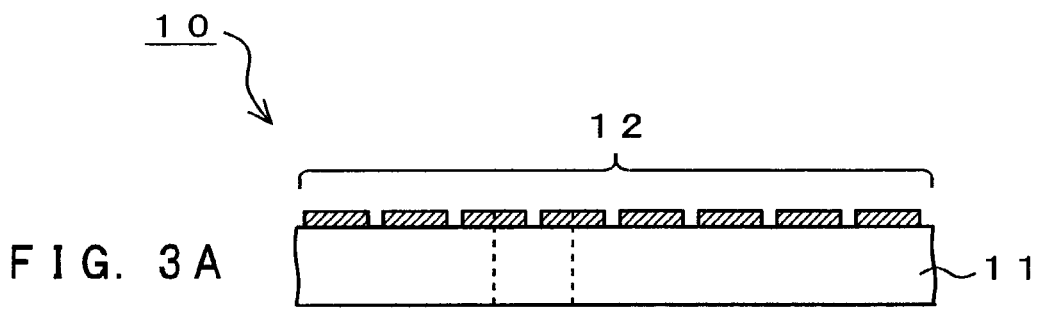
FIGS. 3A–3C are diagrams each showing a process for forming the fingerprint sensor chip 10 in the finger print detection device 100.
Figure 3B:
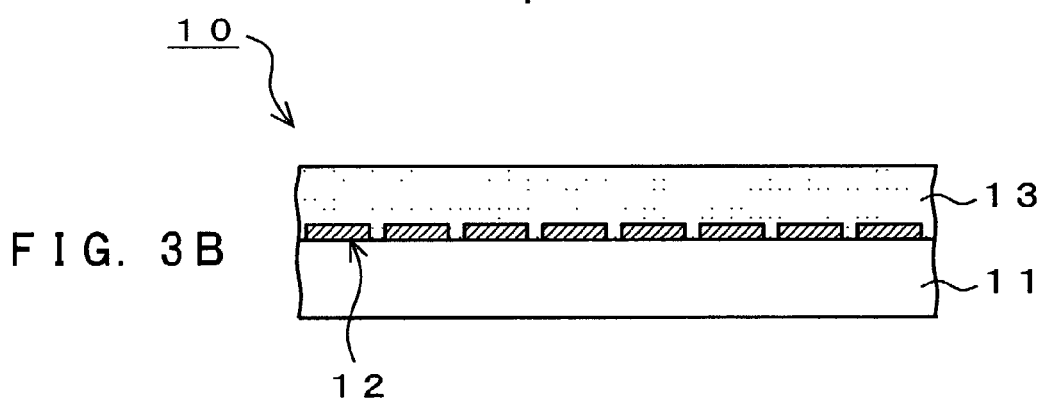
Figure 3C:
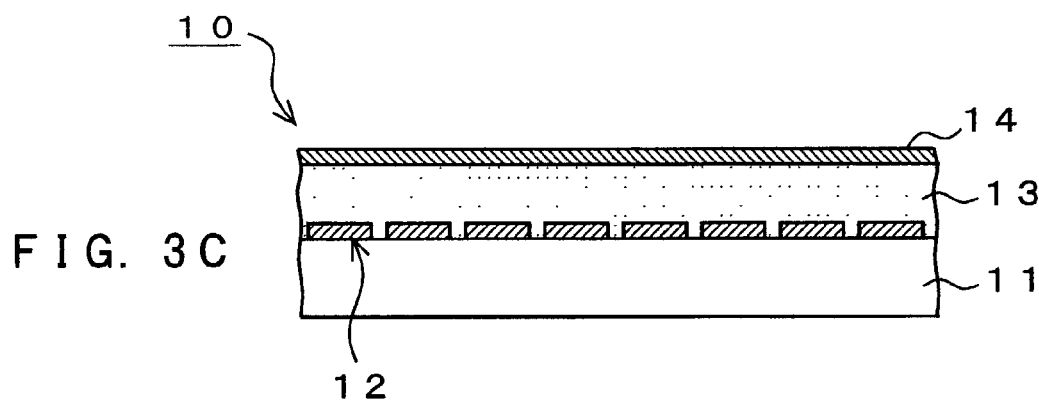

A method of manufacturing the fingerprint detection device 100 will now be described below. FIGS. 3A–3C illustrate a process of forming the fingerprint sensor chip 10 in the fingerprint detection device 100. FIG. 4 is a block diagram showing a constitution of a first embodiment of an apparatus 300 for forming the DLC film.

In this embodiment, a process of forming the DLC film is employed prior to the process of packaging the fingerprint sensor chip 10, for example, prior to the pad electrode fabrication process.

In this manufacturing scheme, the circuit electrodes such as the sense electrodes 12 as shown in FIG. 2 are formed on the semiconductor substrate 11 as shown in FIG. 3A. It is supposed in FIG. 3A, although not shown, that the row drive circuit 16 and the column detection circuit 17 have been already prefabricated on the semiconductor substrate 11. Sense electrodes 12 numbers m in each row and n in each column to form an m by n sense electrode array 15, as shown in FIG. 2. Each of the sense electrodes 12 shown in FIG. 3A is made of Al—Si materials. The pitch p is about 80 micrometers. In patterning the sense electrodes 12, wiring layers for connecting the electrodes 12 with the row drive circuit 16 and the column detection circuit 17 may be formed simultaneously.

Then, as shown in FIG. 3B, an insulating film such as the insulating film 13 of silicon nitride is formed on the surfaces of the semiconductor substrate 11 and the sense electrodes 12. The silicon nitride film 13 is formed by a CVD device to a thickness of about several hundred micrometers.

As shown in FIG. 3C, subsequent to the deposition of the silicon nitride film 13, a carbon based protective film such as the DLC film 14 is formed on top of the silicon nitride film 13. The thickness of the protective film 14 is in the range from 0.2 to 5.0 micrometers, preferably in the range from 0.5 to 2.0 micrometers. The protective film 14 is formed on the silicon nitride film 13 using, for example, the apparatus 300 for forming the DLC film as shown in FIG. 4.

As an example (first film formation method), adequate conditions for forming the film may be: in-chamber back pressure at $1.5 \times 10^{-4}$ Pa; film formation pressure in the range from 2 to 5 Pa; RF power in the range from 0.3 to 2.0 kW, RF power frequency to 13.56 MHz. The resultant chip is then transferred to the pad electrode fabrication process.

The apparatus 300 for forming the DLC shown in FIG. 4 is a first embodiment of the apparatus for forming a protective film of the invention, which is an RF plasma CVD device of parallel-plate electrode type.

The apparatus 300 is designed to grow a DLC film 14 on a surface of specimen. It is provided at the entrance side thereof with a load lock chamber 31, at the center thereof with a plasma chamber 32, and at the exit side thereof with a load lock chamber 33.

The load lock chamber 31 has shutters 31A and 31B, while the load lock chamber 33 has shutters 33A and 33B. The shutter 31B and the shutter 33A are respectively provided at the entrance and the exit ends of the plasma chamber 32.

The plasma chamber 32 is used as an example of a processing container, which is adapted to accommodate a semiconductor wafer 10' as an example of the specimen having thereon a multiplicity of fingerprint sensor chips, and also adapted to expose the chip to plasma 34. Provided inside the plasma chamber 32 are a pair of parallel-plate electrodes 35 and 36, with the electrode 35 grounded.

The other plate electrode 36 is adapted to bear thereon the semiconductor wafer 10' and is connected to a high-frequency power source 38. Plasma 34 is generated between these electrodes 35 and 36. In addition, there are provided, in the plasma chamber 32, lamp heaters 37A and 37B for allowing the semiconductor wafer 10' to be heated, which heaters are connected to temperature controller 37. For example, the temperature controller 37 controls the temperature in the plasma chamber 32 to stay at an arbitrary temperature below 200° C., e.g. room temperature, or above 400° C.

In the preferred embodiment, the temperature is held at 200° C. as a desired temperature. Of course, the DLC film 14 may be formed in a hot atmosphere by setting the temperature of the lamp heaters 37A and 37B at 400° C. Although the DLC film 14 can be grown in such the hot atmosphere during the formation of the sensor chip, the fingerprint sensor chip packaging process is preferably carried out at the temperature below 250° C. since otherwise organic resins evaporates in the packaging process.

The plate electrode 36 is connected to a 13.56 MHz high-frequency RF power source 38 of the plasma generator, whose RF power is regulated in the range of 0.3–2.0 kW. Thus, high-frequency plasma 34 is generated in the plasma chamber 32 maintained at 200° C.

In the apparatus 300 for forming the DLC film, a semiconductor wafer 10' bearing a fingerprint sensor chip, is fed from a transport system into the plasma chamber 32 though the entrance of the load lock chamber 31. The plasma chamber 32 is back-pressured in advance to a level of about $1.5 \times 10^{-4}$ Pa, for example. The semiconductor wafer 10' is carried onto the plate electrode 36 (lower RF electrode) with its film bearing surface oriented upward for deposition of the DLC film.

The shutter 31A is opened to receive the semiconductor wafer 10', and is closed as the semiconductor wafer 10' is carried into the load lock chamber 31. The load lock chamber 31 is then evacuated until its pressure is lowered to that of the plasma chamber 32. When the pressures m the two chambers become the same, the shutter 31B is opened and the semiconductor wafer 10' is set on the plate electrode 36 in the plasma chamber 32.

Then, the temperature controller 37 controls the temperature of the lamp heaters 37A and 37B at 200° C. The RF power available between the parallel-plate electrodes 35 and 36 is regulated to 1.5 kW. The film deposition pressure is set to 3 Pa.

Under this condition, primary material gas 39 which contains hydrocarbon such as methane and ethylene, aromatic hydrocarbons such as benzene and toluene, and alcoholic hydrocarbons such as methanol and ethanol is introduced into the plasma chamber 32. Hydrogen is also introduced as a reactive gas 301 and is mixed with the primary gas. Argon and hydrogen may be mixed as a carrier gas.

In this arrangement, the DLC film 14 is formed on the silicon nitride film 13, resulting in a complete fingerprint sensor chip 10 having the protective DLC film 14 on top of the finger sensing region A. Subsequent steps are the same as in conventional process. The semiconductor wafer 10' is transferred from the plasma chamber 32 to the outside through the load lock chamber 33.

This can be done by opening the shutter 33A and transferring the semiconductor wafer 10' to the load lock chamber 33 after the load lock chamber 33 is back-pressured to about $1.5 \times 104$ Pa The shutter 33A is then closed. The load lock chamber 33 is then decompressed until its pressure lowers to the atmospheric pressure. When the pressure is lowered to the atmospheric pressure, the shutter 33B is opened and the semiconductor wafer 10' is removed to the outside.

In a subsequent step, the semiconductor wafer 10' is diced into sensor chips 10. Each of the fingerprint sensor chips 10 is mounted on the respective substrate 1 and bonded. Then an insulating film 2 is formed on the substrate 1 except for the window section W defining the fingerprint detection area A with the insulating film 2 securely holding the peripheral of the DLC film 14. This completes the fingerprint detection device 100 as shown in FIG. 1A.

In accordance with the first embodiments described above of the fingerprint detection device 100 and the method of its manufacture, the DLC film 14 as the protective film is formed on the uppermost surface of the fingerprint detection area A of the fingerprint sensor chip 10.

As a result, the strength of the surface and the electrostatic discharge withstand voltage of the fingerprint sensor chip 10 may be improved without any protective cover. Moreover, the DLC film 14 prevents the fingerprint detection device 100 from being scratched or stained. Since the protective cover as needed in conventional fingerprint detection device is not required any longer, production of a thinner and less bulky fingerprint detection device 100 is possible.

Realization of a thinner fingerprint sensor chip 10 allows formation of the sense electrodes 12 that can accumulate a larger amount of charge. This also allows higher signal detection potential to be operable. Thus, according to the embodiment of the present invention, a more reliable and accurate fingerprint detection device 100 is provided.

In accordance with the apparatus 300 for forming the DLC film, the DLC film 14 having a predetermined thickness may be formed on an arbitrary semiconductor wafer such as the fingerprint sensor chip 10 at any temperature below 200° C. including room temperature.

Hence, according to the embodiment of the present invention, the DLC film 14 can be formed on a semiconductor wafer, that is, before the fingerprint sensor chip 10 is packaged. Alternatively, the DLC film 14 can be formed on the fingerprint sensor chip 10 after it is packaged. The DLC film 14 may be formed by other techniques than RF plasma CVD technique. For example, it can be formed by sputter microwave plasma CVD technique and laser abrasion technique.

(2) Second Embodiment

FIGS. 5A and 5B respectively show a side elevation view of a second embodiment of a fingerprint detection device and an enlarged cross sectional view of a portion thereof according to the invention. In the second embodiment, a DLC film 14 as a protective film is formed over the entire surface of a fingerprint sensor chip 20 inside a window section W and on insulating film 2 on a peripheral of the window section W after the fingerprint sensor chip 20 is packaged.

A fingerprint detection device 200 shown in FIG. 5A as the second embodiment is designed to detect a fingerprint of person, comprising a fingerprint detectable semiconductor chip (hereinafter referred to as fingerprint sensor chip) 20 formed on a substrate 1. The fingerprint sensor chip 20 has a fingerprint detection area A, as in the first embodiment. Lying beneath the fingerprint detection area A are a multiplicity of sense electrodes 12 arranged in a grid, and a silicon nitride film 13 formed to insulate and protect the sense electrodes 12.

The peripheral section of the silicon nitride film 13 is securely held by an insulating film 2 covering the entire area of the substrate 1 except for a window section W defining the fingerprint detection area A. The window section W is defined by an opening formed in the insulating film 2.

The second embodiment differs from the first one in that the DLC film 14 is formed over the entire surface of the fingerprint sensor chip 20 inside the window section W and on the insulating film 2 on a peripheral of the window section W. The DLC film 14 is thus formed at the last step of the sequence of forming the fingerprint detection device 200. In this case, the DLC film 14 can be formed only over the entire surface of the fingerprint sensor chip 20 inside the window section W by use of a masking technique.

By doing so, the total number of manufacturing steps can be greatly reduced as compared with a case where the step of forming the DLC film 14 during the formation of the semiconductor chip is required. In what follows, those elements having the same names or like functions as those in the first embodiment will be denoted by the same or like reference numerals, and the detailed description therefor will not be repeated for simplicity.

In this embodiment also, the DLC film 14 has a thickness in the range from 0.2 to 0.5 micrometers, preferably from 0.5 and 2.0 micrometers. The hardness of the DLC film 14 is not less than 10 GPa (Giga Pascal), preferably on the order of 20 GPa. Also in this embodiment, the DLC is made from carbon and hydrogen in one approach, and from carbon, hydrogen and/or nitrogen in another approach.

An inventive method of manufacturing the fingerprint detection device 200 will now be described below. FIGS. 6A–6F illustrate a process of forming the fingerprint detection device 200. In this embodiment, the DLC film 14 is formed as a protective film for the fingerprint detection area A after the fingerprint sensor chip 20 is packaged, so that formation of the DLC film 14 during the formation of the fingerprint sensor chip 20 can be omitted.

Figure 6A:
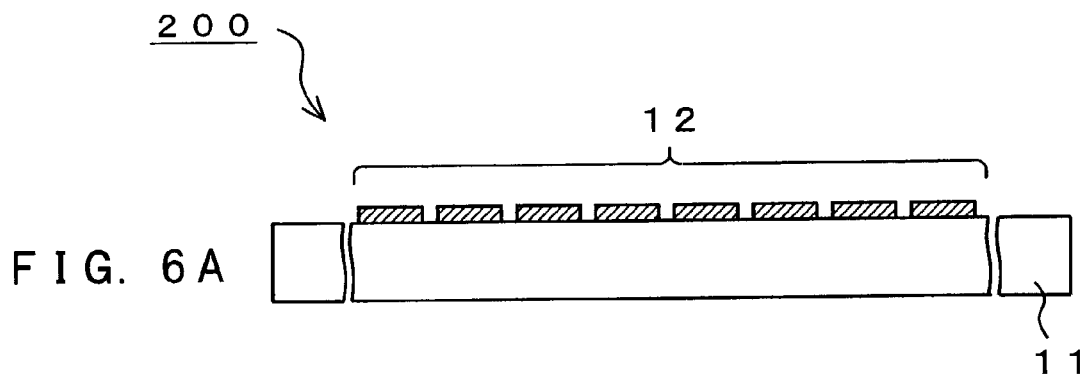
FIGS. 6A–6F are diagrams each showing a process for forming the fingerprint detection device 200 of FIG. 5A.

Under this manufacturing condition, circuit electrodes such as sense electrodes 12 are formed on the semiconductor substrate 11 as shown in FIG. 6A. Although not shown in the FIG. 6A, it is supposed that the row drive circuit 16 and the column detection circuit 17 have been already prefabricated on the semiconductor substrate 11, as in the first embodiment.

Figure 6B:
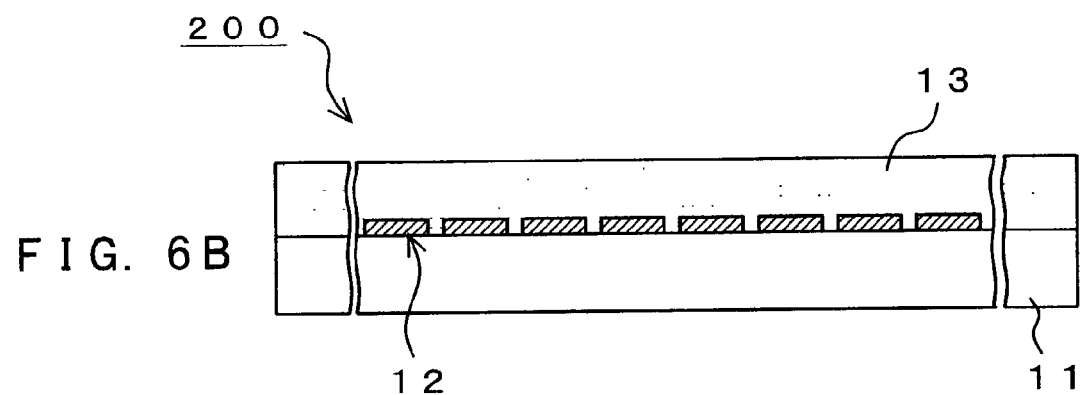
Figure 6C:
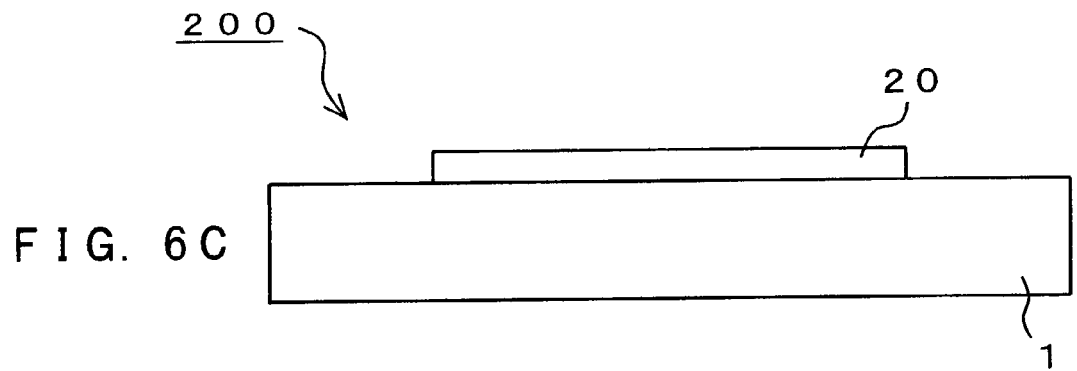

The silicon nitride film 13 is then formed on the entire surfaces of the semiconductor substrate 11 and the sense electrodes 12, as shown in FIG. 6B. The silicon nitride film 13 is formed by a sputter device to a thickness ranging from 2 to 3 micrometers. Unlike the first embodiment, the fingerprint sensor chip 20 is now completed without forming the DLC film 14. The fingerprint sensor chip 20 is then transferred to a packaging process, where it is mounted on the substrate 1 and bonded, as shown in FIG. 6C. The fingerprint sensor chip 20 is bonded to the substrate 1 using glue.

Figure 6D:
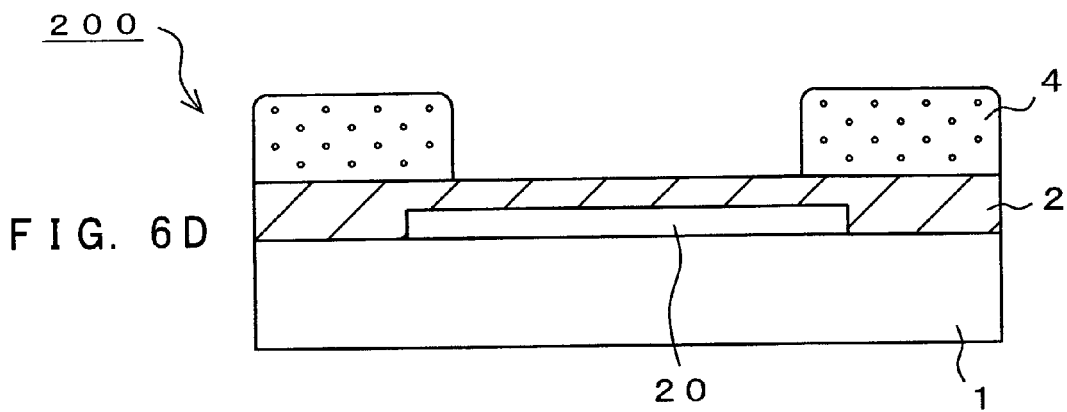
Figure 6E:
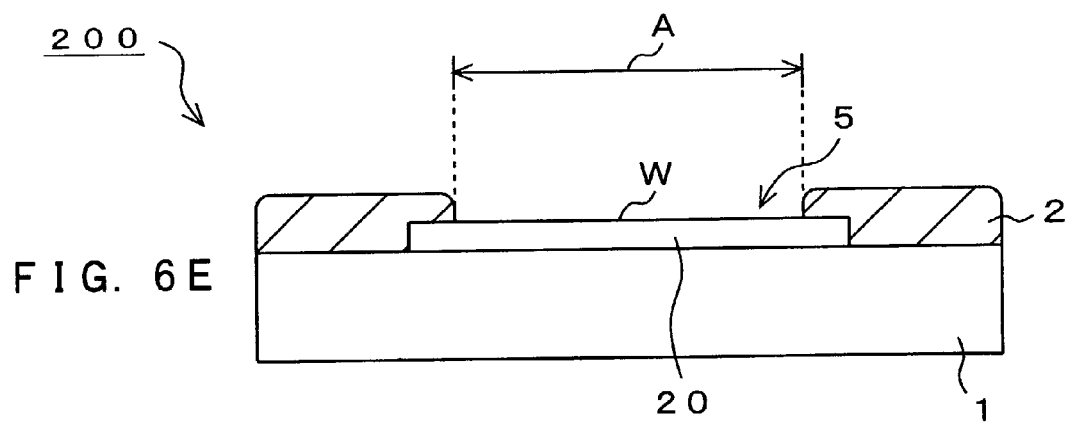

An insulating film 2 is then formed over the entire surfaces of the substrate 1 and the fingerprint sensor chip 20, as shown in FIG. 6D. The insulating film 2 is preferably an organic resin insulating film. In order to form the window section W relating to the fingerprint detection area A, a patterned resist film 4 may be used in a photolithography technique to mask the fingerprint detection area A. By removing portions not needed of the insulating film 2, an opening 5 is obtained as shown in FIG. 6E. It will be understood that the above mentioned photolithography step is not needed if a plastic injection molding apparatus using metal pattern is utilized. If using the plastic injection molding apparatus, opening 5 is cut as the window W with a die.

Through this step, the fingerprint sensor chip 20 is formed which has at the uppermost level thereof an exposed layer of silicon nitride 13 (not shown) beneath the finger detection area A, as shown in FIG. 6E. The peripheral section of the fingerprint sensor chip 20 is securely held by an insulating film 2 which covers the entire surface of the substrate 1 except for the window section W defining the fingerprint detection area A. The window section W is defined by the opening 5 formed in the insulating film 2.

Figure 6F:
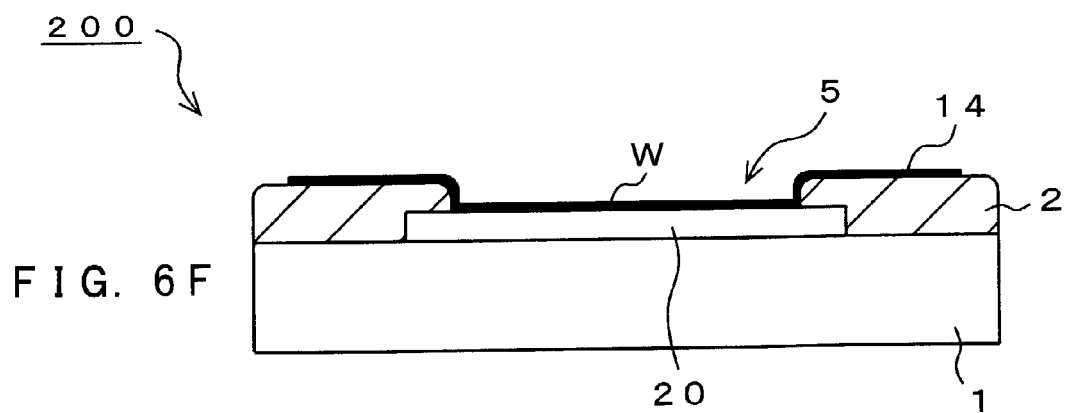

A DLC film 14 is then formed over the entire surface of a fingerprint sensor chip 20 inside a window section W and on insulating film 2 on a peripheral of the window section W, as shown in FIG. 6F. As in the first embodiment, the thickness of the DLC film 14 is in the range from 0.2 to 5.0 micrometers, preferably in the range from 0.5 to 2.0 micrometers. The DLC film 14 is illustratively formed on the silicon nitride film 13 inside the window section W as well as on the insulating film 2 on a peripheral of the window section W using the apparatus 300 for forming the DLC film as shown in FIG. 4. The condition for this film formation is the same as that for the first embodiment described previously. The last step described above completes the fingerprint detection device 200 shown in FIG. 5A.

Thus, due to the fingerprint detection device 200 as the second embodiment of the fingerprint detection device according to the invention, the protective DLC film 14 is formed over the entire surface of a fingerprint sensor chip 20 inside the window section W defining the fingerprint detection area A and on the insulating film 2 on a peripheral of the window section W, thereby improving the strength of the surface and the electrostatic discharge withstand voltage of the fingerprint sensor chip 20 without any protective cover. Particularly, peripheral section of the insulating film 2 surrounding the window section W can be also reinforced by the DLC film 14, thereby allowing provision of a more reliable fingerprint detection device 200.

The process of forming the DLC film 14 during formation of a fingerprint sensor chip and the process of forming the DLC film 14 during packaging of a fingerprint sensor chip are compared as follows. It is noted that quite a few fabrication steps can be omitted in the latter process. FIGS. 7A–9B are diagrams each showing compared examples of the processes of forming the DLC films during chip formation and during packaging.

Figure 7A:
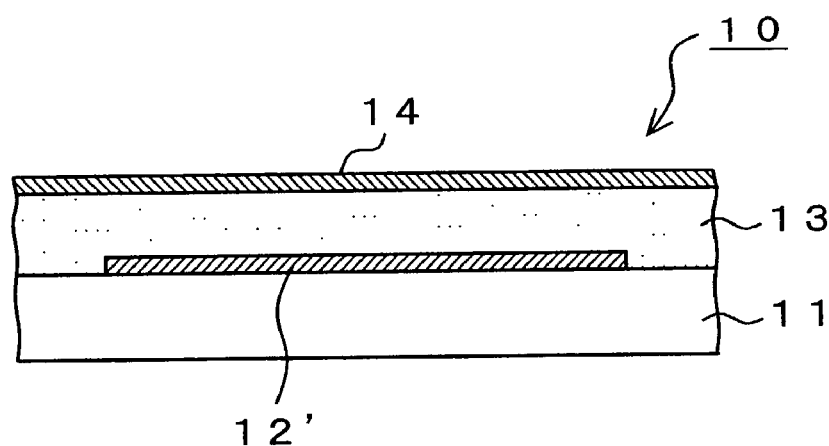
FIG. 7A is a cross sectional view of a fingerprint sensor chip forming the DLC film thereon during the formation of the chip.
Figure 7B:
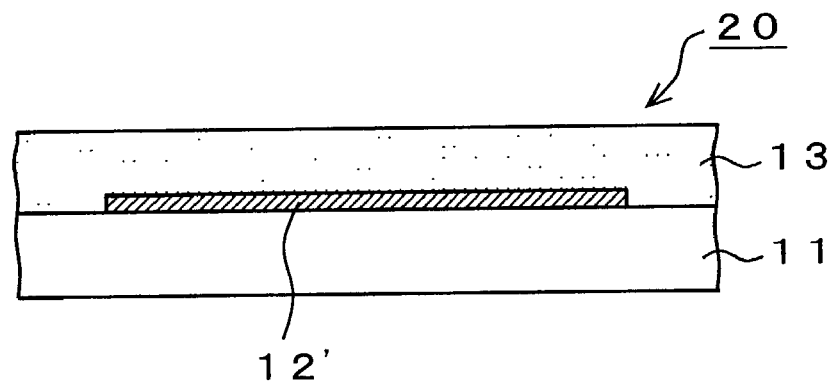
FIG. 7B is a cross sectional view of a fingerprint sensor chip in which no DLC film is formed during the formation of the chip.

FIG. 7A is a cross sectional view of a fingerprint sensor chip, showing that the DLC film is formed during the formation of the chip. FIG. 7B is a cross sectional view of a fingerprint sensor chip, showing that a DLC film is not formed during the formation of the chip.

In these compared examples, the numbers of the fabrication steps of forming the fingerprint sensor chip 10 and of forming the fingerprint sensor chip 20 are compared with each other for case where a contact hole is provided relating to the pad electrode 12' formed on the semiconductor substrate 11.

In the case of fingerprint sensor chip 10 shown in FIG. 7A, since the DLC film 14 is formed on the silicon nitride film 13, a portion of the DLC film 14 over a region where the contact hole will be formed must be first removed. To do this, a hard mask is formed on the DLC film 14 as shown in FIG. 8 to selectively remove that portion of the DLC film 14 lying on the pad electrode 12'. A plasma SiO film, a plasma SiN film, and an Al film, for example, can be used for the mask 18. A mask having a small etching rate is used for $O_2$ plasma.

Figure 8A:
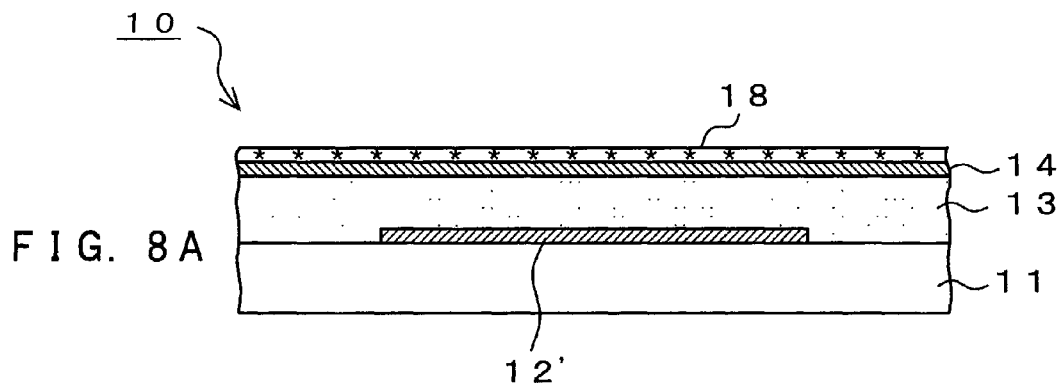
FIGS. 8A–8F are diagrams each showing a process for forming a fingerprint sensor chip forming the DLC film thereon.
Figure 8B:
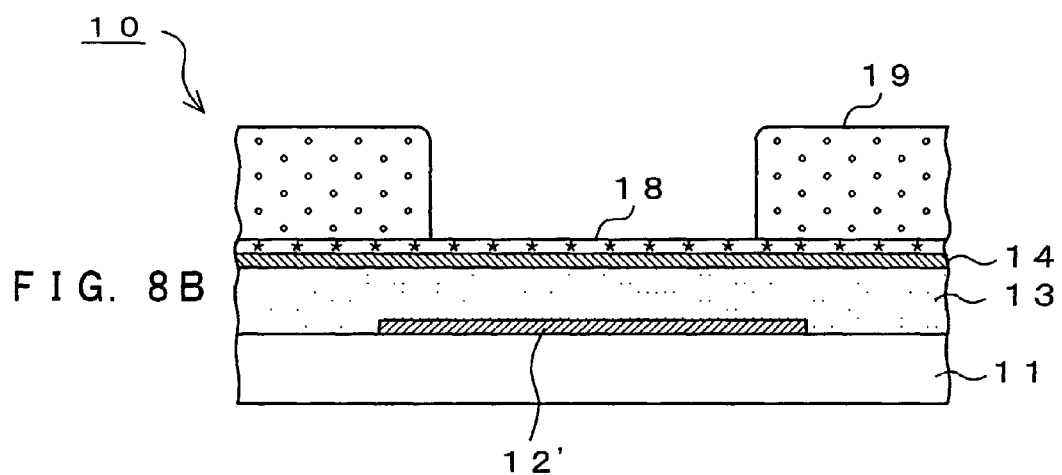
Figure 8C:
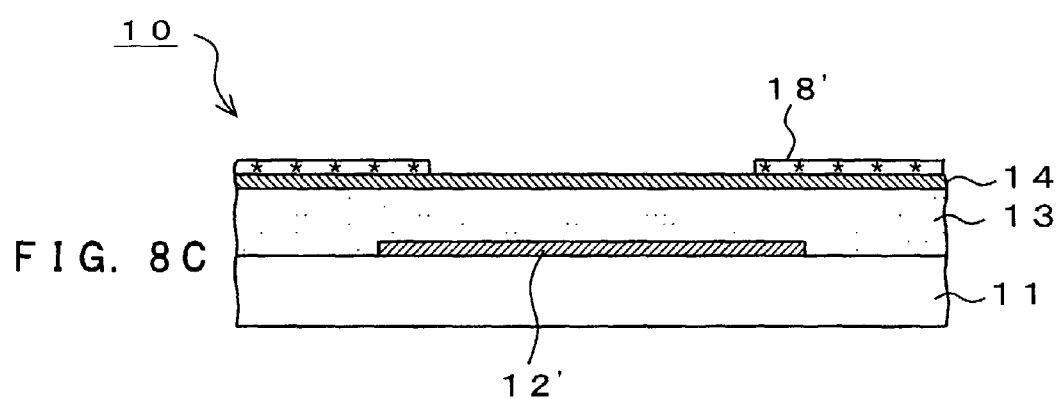

A photoresist is then coated on the mask 18 as shown in FIG. 8B, which photoresist is masked by a preferred reticle, exposed to light, and developed to pattern photoresist layer 19 as needed. This patterned photoresist layer 19 is used as a mask to selectively remove the mask member 18 in the etching of the fingerprint sensor chip 10. Subsequent to the etching, a hard mask 18' is formed on the DLC film 14 as shown in FIG. 8C by removing the photoresist layer 19. Next, etching is performed using this hard mask 18' to selectively remove the DLC film 14.

Figure 8D:
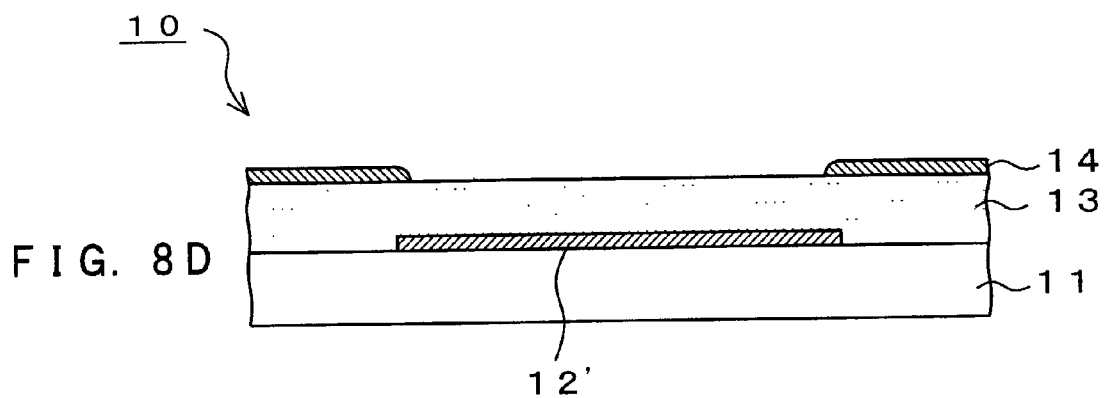

For example, portions of the DLC film 14 not covered with the hard mask 18' are etched away in $O_2$ plasma etching. After this etching, an opening is made in the DLC film 14 by removing the hard mask 18' to expose silicon nitride film 13, as shown in FIG. 8D.

Figure 8E:
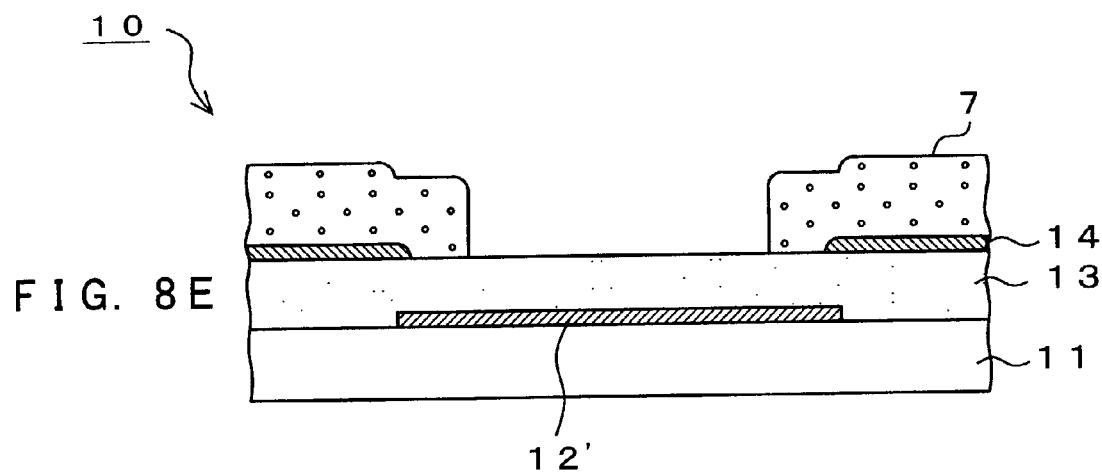
Figure 8F:
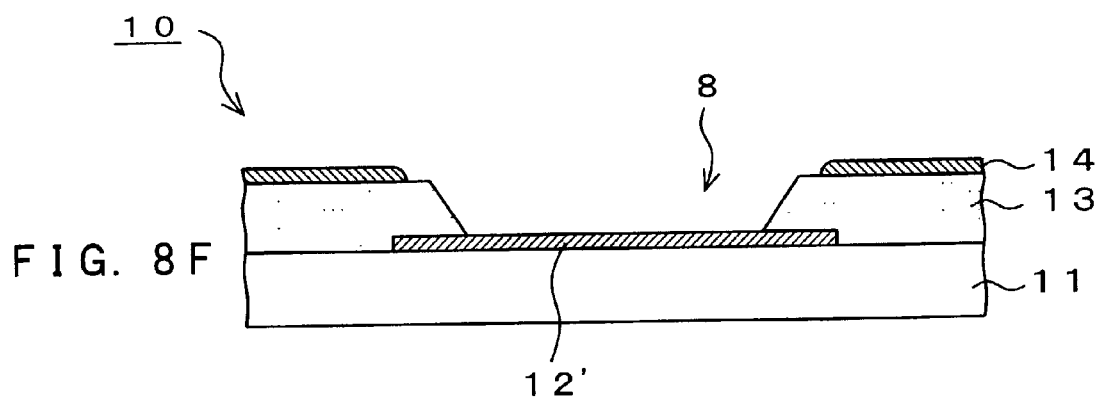

Then the DLC film 14 is again coated with a photoresist, and so is the exposed silicon nitride film 13 this time, as shown in FIG. 8E. The photoresist is then masked by a desired reticle, exposed to light, and developed to pattern photoresist layer 7. The photoresist layer 7 is provided to define a contact hole relating to the pad electrode 12'. The photoresist layer 7 is used as a mask in the etching to selectively remove the silicon nitride film 13. Following the etching, the photoresist layer 7 is removed to form a contact hole 8 communicating with the pad electrode 12' as shown in FIG. 8F.

If the process of forming a DLC film is applied during the formation of the fingerprint sensor chip as described above, seven steps as shown in FIG. 7 and FIGS. 8–8F are necessary only for the formation of the DLC film 14.

In contrast, in the second method, the process of forming a DLC film 14 is not performed during the formation of the fingerprint sensor chip. Instead, the DLC film 14 is formed after a completion of the fingerprint sensor chip, i.e. in the last packaging step, as described in connection with FIG. 6F. In this case, a photoresist is applied to the silicon nitride film 13 of the fingerprint sensor chip 20 as shown in FIG. 7B.

Figure 9A:
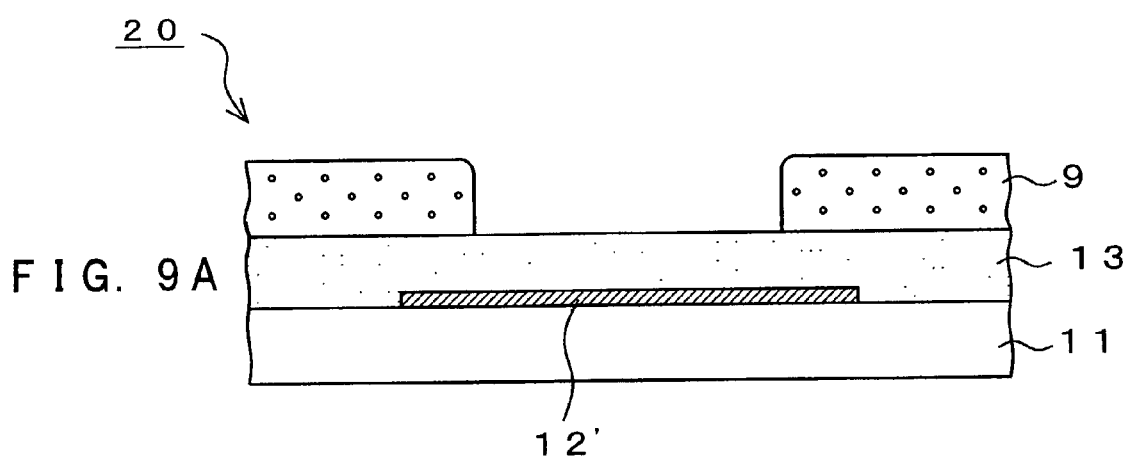
FIGS. 9A and 9B are diagrams each showing a process for forming a fingerprint sensor chip in which no DLC film is formed.
Figure 9B:
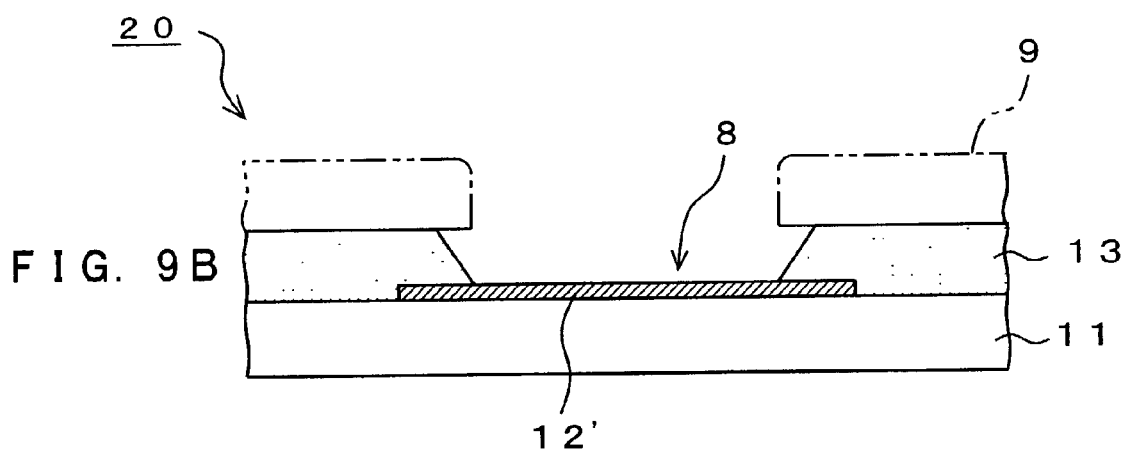

The photoresist is masked with a preferred reticle, exposed to light, and developed to pattern photoresist layer 9 as shown in FIG. 9A. The photoresist layer 9 is used to define contact hole on the pad electrodes. By masking the silicon nitride film 13 with the photoresist layer 9, the silicon nitride film 13 is selectively removed by etching. Following the etching, the photoresist layer 9 is removed to form a contact hole 8 that communicates with the pad electrodes 12', as shown in FIG. 9B.

Thus, instead of introducing the DLC film forming process into the process of formation of the fingerprint sensor chip, the DLC film 14 is formed after the completion of the chip, e.g. in the last packaging step, as described in connection with FIG. 6F. In this case, the steps required for processing the DLC film 14 are two steps shown in FIG. 9A and 9B plus one step shown in FIG. 6F, totaling only three steps. Consequently, four steps can be omitted.

It will be appreciated that the DLC film can be conveniently formed in the packaging stage, for the reason that the DLC film can be formed by, for example, plasma CVD at a temperature below 250° C.

In general, packaging reflow of resin is performed in certain atmosphere at about 250° C. If above this temperature, elements contained in the resin become evaporated to harm the growing DLC film. Hence, the DLC film is preferably performed in an atmosphere below 250° C.

As described above, in accordance with the method of manufacturing a fingerprint detection device as the second embodiment, the strength of the surface and the electrostatic discharge withstand voltage of the fingerprint sensor chip 20 can be enhanced without any protective cover. Particularly, portion of the insulating film 2 on a peripheral of the window section W can be also reinforced by the DLC film 14, which permits manufacturing a reliable fingerprint detection device 200. Moreover, steps for processing the DLC film 14 are greatly simplified as described above in connection with FIGS. 7A–9B.

(3) Further Apparatus for Forming DLC Film

FIG. 10 is a block diagram representation of a second embodiment of an apparatus for forming DLC film according to the invention. In the example shown herein, the apparatus is constituted as the apparatus 500 for forming DLC film using a hollow cathode ion plating device.

The apparatus 500 for forming DLC film as shown in FIG. 10 is an example of the second embodiment of an apparatus for forming DLC film according to the invention and grows the DLC film 14 on an arbitrary specimen by introducing carbon and hydrogen in addition to nitrogen. The apparatus 500 for forming the DLC film is provided at the entrance side thereof with a load lock chamber 31, at the center thereof with a processing chamber 52, and at the exit side thereof with a load lock chamber 33. In what follows those elements having the same name or like functions as in the first embodiment will be denoted by the same or like reference numerals, and for simplicity the detailed description thereof will not be repeated.

The processing chamber 52 is an example of a processing container, which is adapted to accommodate therein a multiplicity of packaged fingerprint sensor chips 10 so as to expose the chips to a carrier gas carrying a primary material gas 39. Provided inside the processing chamber 52 are a table (referred to as specimen table) 54 for supporting thereon a specimen, a hollow cathode gun 55, and an assist gun 56.

A multiplicity of packaged fingerprint sensor chips 10 are placed on the specimen table 54, which contains a built in susceptor (not shown) for keeping the semiconductor wafer 10' at a constant temperature. The susceptor is connected to a temperature controller 37 as temperature control means for controlling the temperature of the fingerprint sensor chip 10 in the processing chamber 52 at or below 200° C.

Provided at a position facing the specimen table 54 in the processing chamber 52 is an ion gun in the form of a hollow cathode 55, which, when its output power is adjusted at a predetermined level, ionizes a carrier gas such as argon Ar introduced in the processing chamber 52 to irradiate the primary material gas 39 and reactive gas 301 onto the specimen. The pressure of the gas during film formation is set to about 3 Pa.

Provided in proximity to the specimen table 54 is a second ion gun in the form of assist gun 56, which regulates the scattering of the primary materiel gas 39 delivered to a surface of the specimen by the hollow cathode gun 55 and the scattering of reaction products produced by the reactive gas 301.

As primary gas 39, hydrocarbon such as methane and ethylene, aromatic hydrocarbon such as benzene and toluene, and alcoholic hydrocarbon such as methanol and ethanol can be used, as in the first embodiment. In addition, hydrogen gas is used as reactive gas 301.

That is, in the apparatus 500 for forming the DLC film, packaged fingerprint sensor chips 10 are delivered from a transport system into the processing chamber 52 through the load lock chamber 31 provided at the entrance side thereof. The temperature controller 37 regulates the temperature of the susceptor (not shown) at or below 200° C. In the processing chamber 52, the primary material gas 39 such as carbon and hydrogen in addition to nitrogen and the reactive gas 301 are irradiated to the surface of specimen with the carrier gas ionized by the hollow cathode gun 55. The assist gun 56 controls the thickness of the DLC film 14 formed on the surface of specimen.

Thus, in accordance with the apparatus 500 for forming the DLC film, the DLC film having desired thickness can be formed on the outermost surface of the packaged fingerprint sensor chip 10 at or below 200° C.

Figure 11:
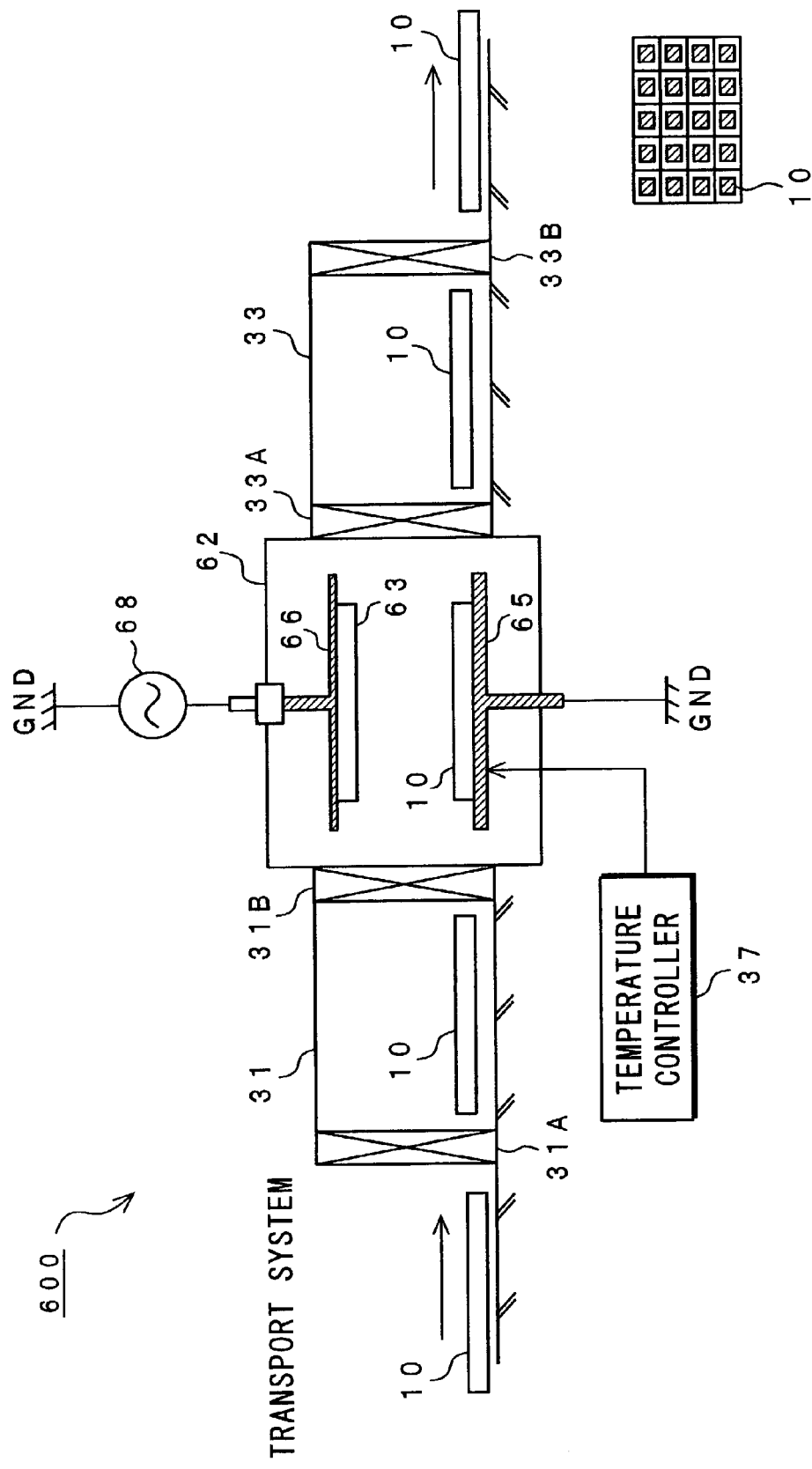
FIG. 11 is a block diagram representation of a third embodiment of an apparatus 600 for forming DLC film according to the invention.

FIG. 11 is a block diagram illustrating a third embodiment of an apparatus for forming a DLC film. In this embodiment, the apparatus is constituted as the apparatus 600 for forming DLC film utilizing a RF sputtering apparatus.

The apparatus 600 for forming the DLC film as shown in FIG. 11 is an example of the third embodiment of an apparatus for forming DLC film according to the invention and grows the DLC film 14 on an arbitrary specimen. The apparatus 600 for forming the DLC film is provided at the entrance side thereof with a load lock chamber 31, at the center thereof with a processing chamber 62, and at the exit side thereof with a load lock chamber 33. In what follows those elements having the same name or like functions as in the first embodiment will be denoted by the same or like reference numerals, and for simplicity the detailed description thereof will not be repeated.

The processing chamber 62 is an example of a processing container, which is adapted to receive argon gas and accommodate a multiplicity of packaged fingerprint sensor chips 10 so as to expose the fingerprint sensor chips 10 to RF sputtered argon atoms.

Provided in the processing chamber 62 are a pair of parallel-plate electrodes 65 and 66 forming a plasma generator. The plate electrode 65 is connected to a ground line GND provided at one side of the processing chamber 62. Packaged fingerprint sensor chips 10 are mounted on the plate electrode 65. The plate electrode 65 has a built-in susceptor (not shown) for keeping the fingerprint sensor chips 10 at a fixed temperature. The susceptor is connected to a temperature controller 37 as temperature control means for controlling the fingerprint sensor chips 10 in the processing chamber 62 at a temperature of, for example, 200° C.

The plate electrode 66 is provided at a position to oppose the plate electrode 65. Mounted on the plate electrode 66 is a target carbon material 63. The plate electrode 66 is connected to a high-frequency power source 68 constituting the plasma generator to generate high-frequency ion plasma between the parallel-plate electrodes 65 and 66. The RF power is regulated. One terminal of the high-frequency power source 68 is connected to the plate electrode 66 and the other terminal of the high-frequency power source 68 is connected to the ground line GND.

That is, in the apparatus 600 for forming the DLC film, packaged fingerprint sensor chips 10 are delivered from the transport system into the processing chamber 42 through the load lock chamber 31 provided at the entrance side thereof. The temperature controller 37 regulates the temperature of the susceptor (not shown) at or below 200° C. The RF power of the high-frequency power source 68 is regulated to 1.5 kW, for example, and the film forming pressure is set to 3 Pa. In this condition, argon Ar is hurled at the carbon material. The carbon material is then sputtered. Sputtered carbon atoms are deposited on the fingerprint sensor chips 10.

Thus, by use of the apparatus 600 for forming the DLC film, the DLC film having desired thickness can be formed on the outermost surfaces of the respective fingerprint sensor chips 10 at a low temperature below 200° C.

Figure 12:
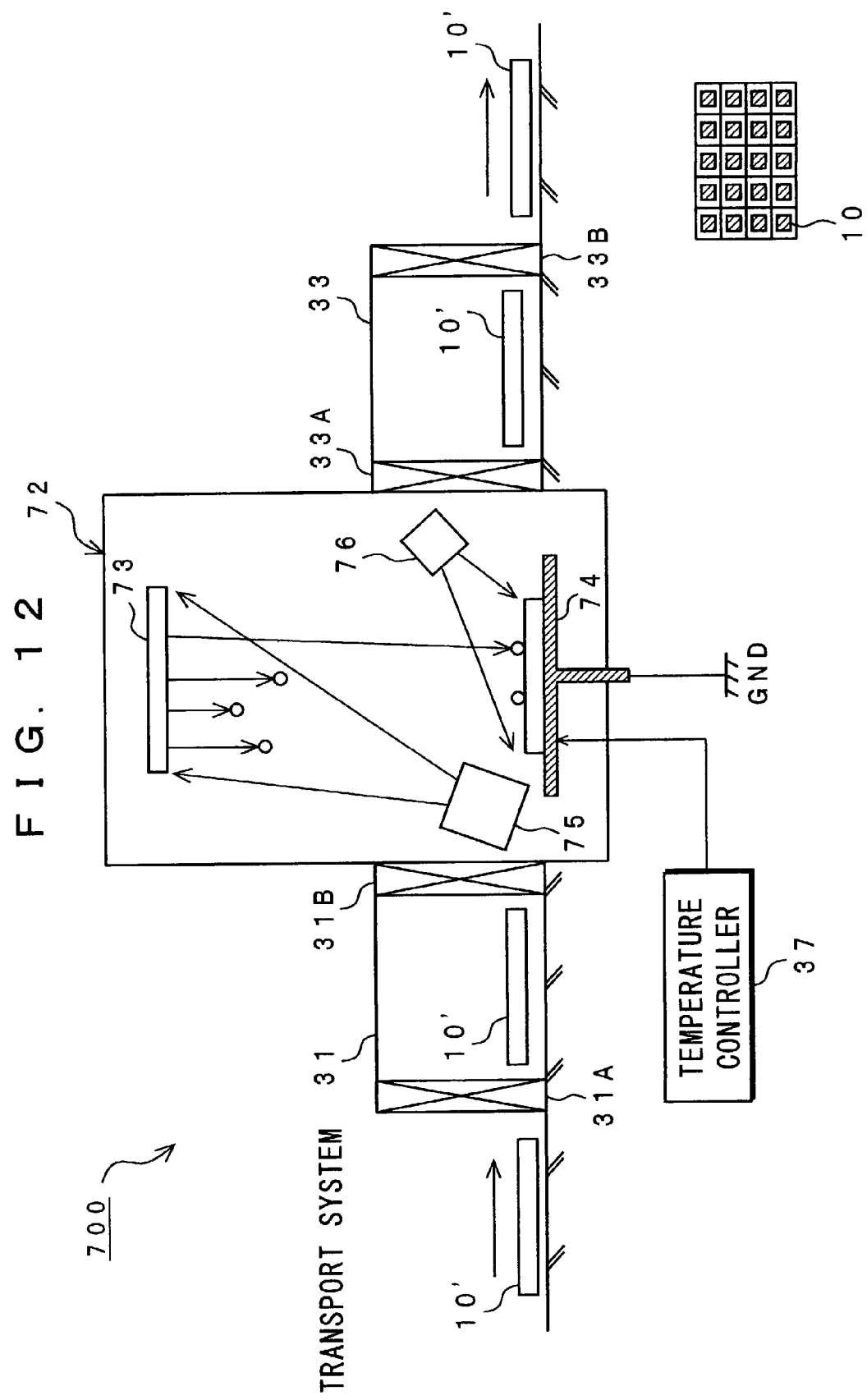
FIG. 12 is a block diagram representation of a fourth embodiment of an apparatus 700 for forming DLC film according to the invention.

FIG. 12 is a block diagram illustrating a fourth embodiment of an apparatus for forming DLC film according to the invention. In this embodiment, the apparatus is constituted as the apparatus 700 for forming DLC film using an ion beam sputtering apparatus.

The apparatus 700 for forming the DLC film as shown in FIG. 12 is an example of the fourth embodiment of an apparatus for forming DLC film according to the invention and grows the DLC film 14 on an arbitrary specimen by introducing carbon and hydrogen in addition to nitrogen. The apparatus 700 for forming the DLC film is provided at the entrance side thereof with a load lock chamber 31, at the center thereof with a processing chamber 72, and at the exit side thereof with a load lock chamber 33. In what follows those elements having the same name or like functions as in the first embodiment will be denoted by the same or like reference numerals, and for simplicity the detailed description thereof will not be repeated.

The processing chamber 72 is an example of a processing container, which is adapted to accommodate a multiplicity of packaged fingerprint sensor chips 10 so as to expose the fingerprint sensor chips 10 to sputtered carbon atoms. The processing chamber 72 includes therein a specimen table 74, which also functions as an electrode, ion gun 75, and an assist gun 76.

The specimen table 74 is grounded, and a multiplicity of packaged fingerprint sensor chips 10 are set thereon. The specimen table 74 has a built-in susceptor (not shown) for keeping the fingerprint sensor chips 10 at a fixed temperature. The susceptor is connected to a temperature controller 37 as temperature control means for controlling the fingerprint sensor chips 10 in the processing chamber 72 at a temperature below 200° C., for example.

A carbon material 73 is provided at a position to oppose the specimen table 74 in the processing chamber 72. A first ion gun in the form of ion gun 75 is mounted at a position near the specimen table 74 and to oppose the carbon material 73. When the output of the ion gun 75 is adjusted to a predetermined level, the gun sputters the carbon material 73 by means of ionized carrier gas of argon, for example, introduced into the processing chamber 72. The film formation pressure is set to about 3 Pa.

Provided in proximity to the specimen table 74 is a second ion gun in the form of assist gun 76, which regulates scattering of carbon atoms reaching a surface of the specimen from an ion gun 75.

That is, in the apparatus 700 for forming the DLC film, packaged fingerprint sensor chips 10 are delivered from by transport system into the processing chamber 72 through the load lock chamber 31 provided at the entrance side thereof. The temperature controller 37 regulates the temperature of the susceptor (not shown) at or below 200° C. In the processing chamber 72, as the carbon material 73 is sputtered by the ion gun 75, sputtered carbon atoms are deposited on the fingerprint sensor chips 10. The assist gun 56 controls the thickness of the DLC film 14 formed on the uppermost surfaces of the respective fingerprint sensor chips 10.

Thus, by use of the apparatus 500 for forming the DLC film, the DLC film having desired thickness can be formed on the outermost surfaces of the packaged fingerprint sensor chips 10 at 200° C. or at a lower temperature.

FIG. 13 is a table listing the reliability assessment of the DLC films 14 thus formed, rather large thickness of about 1.5 micrometers and 2.0 micrometers, respectively, exhibit good results as compared with thinner Examples 1 and 2 which are 0.5 and 1.0 micrometer thick, respectively.

Example 5 formed with methane plus hydrogen as material gas also exhibits good result like Examples 3 and 4 in the scratching test. Examples 6–9 having a thickness of 2.0 micrometers exhibit hardness exceeding 20 GPa, although they are inferior to Examples 3–5 in scratching test. In the scratching test, Comparative Example 2 typifying a thin film of 0.1 micrometer is scratched (NG). It is seen in the table that ESD withstand voltage is improved in all the cases if the DLC film 14 is formed, thereby ensuring the reliability thereof.

Figure 14:
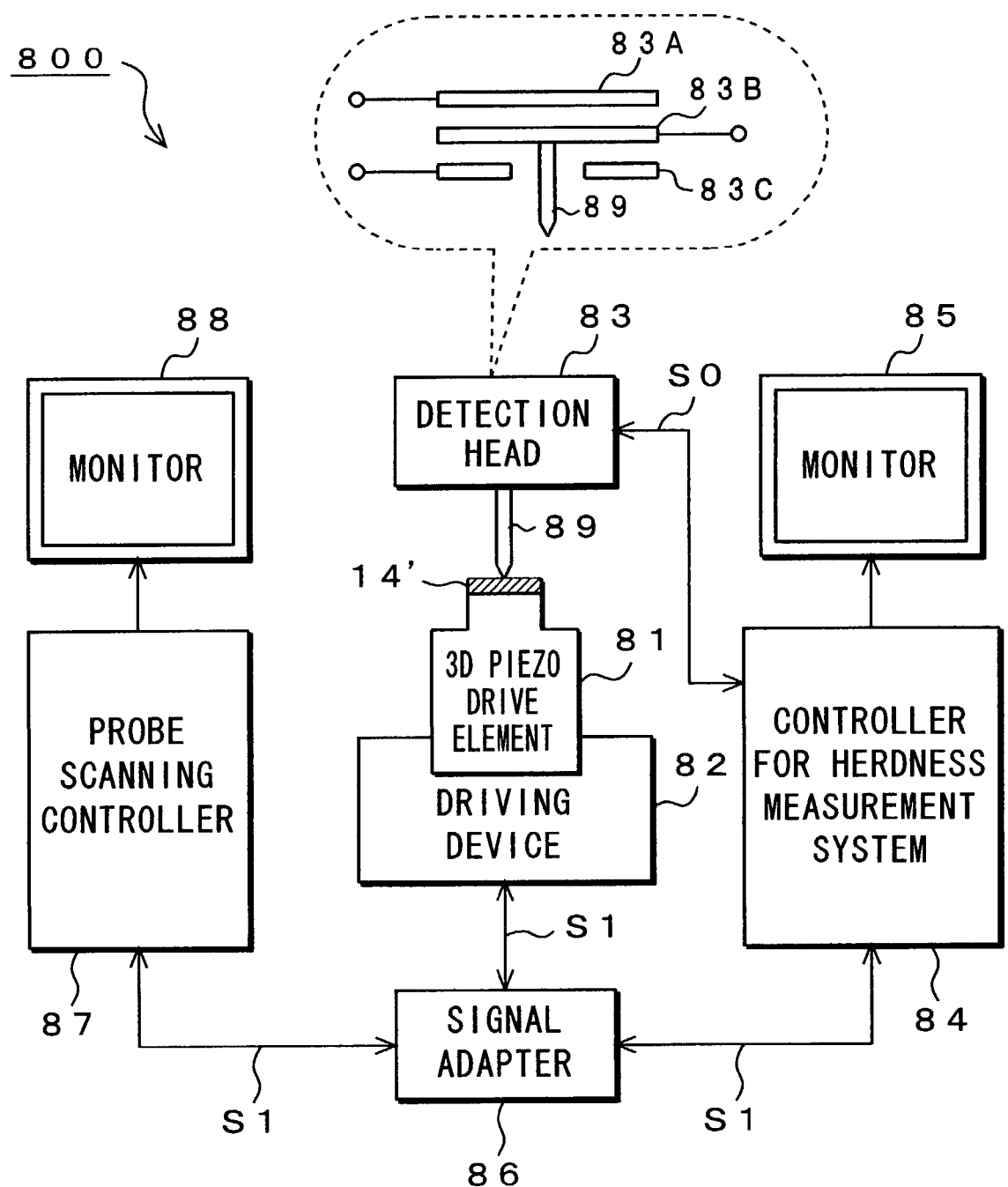
FIG. 14 is a block diagram representation of a constitution of triboscope apparatus 800 for use in the hardness measurement of DLC films 14.

The triboscope apparatus 800 shown in FIG. 14 is an apparatus for measuring hardness of a specimen. The triboscope apparatus 800 has a three-dimensional (3D) piezo drive element 81 constituting scanning electron microscope. A driving device 82 drives the 3D piezo drive element 81 upwardly and downwardly. A test specimen 14' such as a DLC film is mounted on the 3D piezo drive element 81.

A probe 89 depending from a detection head 83 touches the test specimen 14'. Touching the test specimen 14' with the probe 89 results in an impression on the surface of the test specimen. The detection head 83 incorporates three series-connected condensers 83A–83C consisting of three parallel plates. The probe 89 is mounted on the middle parallel-plate electrode 83B. Upward and downward displacement of the probe 89 causes the spacing in each of the two condensers to change, which in turn changes the capacitance of each of the condensers, reflecting the hardness of the specimen 14'.

The detection head 83 is connected to a controller 84 for measuring the hardness of the test specimen 14' based on a linear output signal SO caused by the change in capacitance of the condenser. The controller 84 is connected to a monitor 85 for displaying the measured hardness of the test specimen 14'.

The controller 84 is also connected to a signal adapter 86, which supplies to the driving device 82 a touch position signal S1 indicative of the impression. Connected to the signal adapter 86 is a probe-scanning controller 87 for image-processing of cross sections of the test specimen. Connected to the controller 87 is a monitor 88 for displaying the image of the test specimen in cross section.

Figure 15:
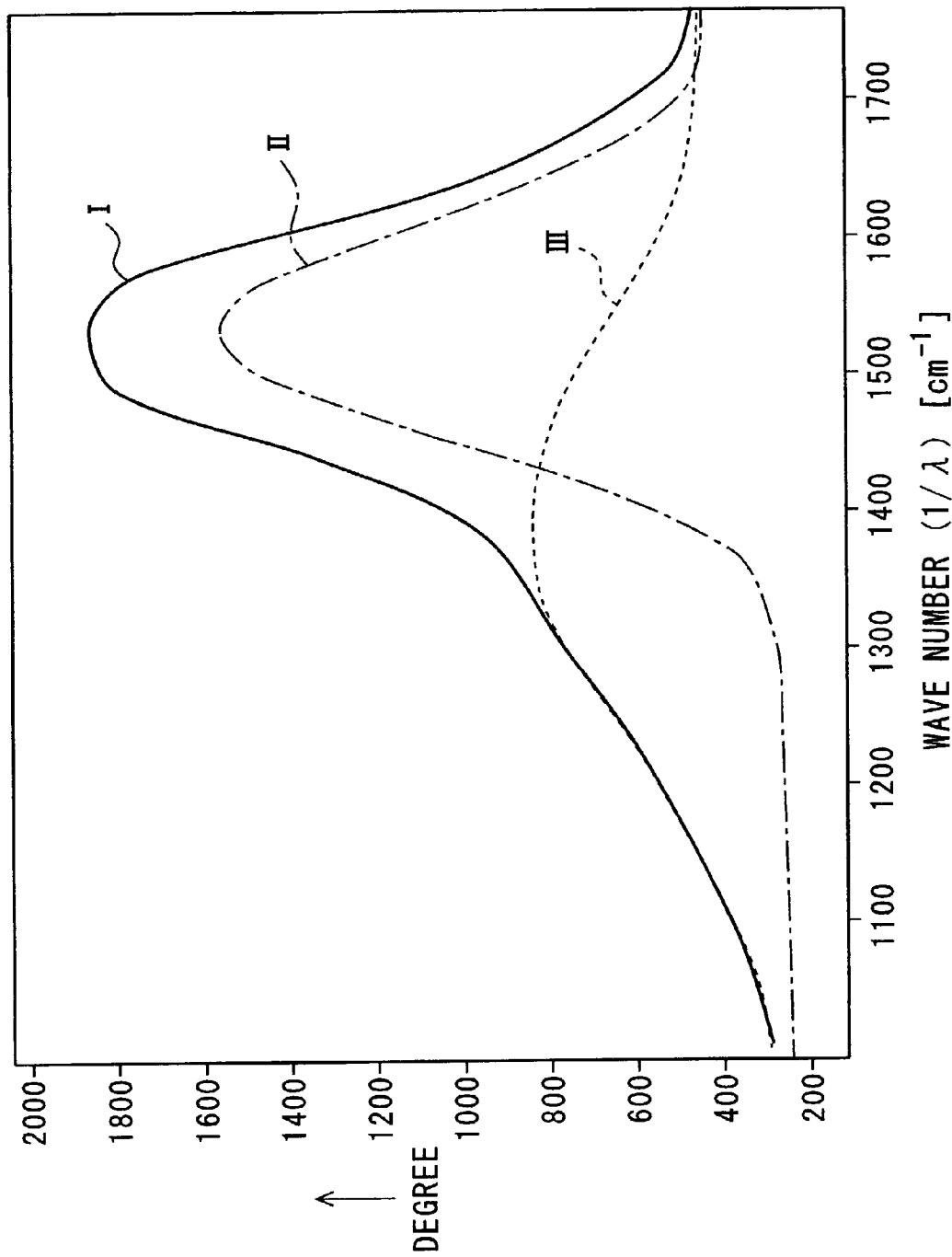
FIG. 15 is a graphical representation of analyses of DLC films 14.

FIG. 15 shows characteristic Raman spectra used in Raman spectroscopy. In FIG. 15, the ordinate indicates the degree indicative of the intensity of light and the ordinate indicates wave number (which is defined to be the inverse of the wavelength $(1/\lambda)$). A solid line curve I represents a DLC film 14 having a peak intensity near 1560 $cm^{-1}$. The curve I is obtained by adding the intensities of the dotted line curve II and a broken line curve III together.

The curve II is called G band, which exhibits a maximum degree indicative of light intensity near 1560 $cm^{-1}$. By means of this G band, optimum quality of a film can be determined based on the peak intensity, half-width, and peaking wave number of the Raman spectrum arising from SP2 coupling with carbon. The curve III is called D band, which has a maximum degree indicative of the peak intensity of light near 1333 $cm^{-1}$. The maximum arises from a structurally disturbed SP2 coupling.

In the embodiment shown herein, reference or standard Raman spectra for different materials are obtained in advance, in particular for methane used in Examples 1-4, methane plus hydrogen used in Example 5, methane plus nitrogen used in Example 6, ethylene used in Example 7, ethylene plus hydrogen used in Example 8, and ethylene plus hydrogen plus nitrogen used in Example 9 as shown in FIG. 13.

In subsequent analyses of unknown DLC film 14, the Raman spectra of the unknown DLC film 14 are compared with the reference or standard spectra to determine the compositions of the DLC film 14. By analyzing the Raman spectrum, it is of course possible to determine if a desired DLC film 14 has been formed on a sensor chip.

Although the invention has been described with reference to particular embodiments where DLC films 14 are formed on silicon nitride layers, it will be apparent to a person skilled in the art that the invention is not limited to these embodiments. For example, silicon dioxide film may be formed as an intermediate layer between the silicon nitride layer and the DLC film 14, thereby enhancing adhesive power of film to the layer.

The invention is extremely suitable for a fingerprint detection and/or verification system utilizing capacitance variations of condensers.

Thus has been shown and described various embodiments of a fingerprint detection device and a method of its manufacture as well as an apparatus for forming a protective film in accordance with the invention. While the foregoing specification has described preferred embodiments of the present invention, one skill in the art may make many modifications to the preferred embodiments without departing from the invention in its broader aspects. The appended claims therefore are intended to cover all such modifications as fall within the true scope and spirit of the invention.

What is claimed is:

1. A fingerprint detection device, comprising:
   a substrate;
   a semiconductor chip for detecting a fingerprint formed on the substrate and having a fingerprint detection area;
   an insulating film formed over the substrate and the semiconductor chip, said insulating film having a window section defining the fingerprint detection area; and
   a carbon based protective film formed over an entire surface of the semiconductor chip inside said window section and extending over the insulating film on a periphery of the window section.

2. The fingerprint detection device according to the claim 1, wherein said carbon based protective film is a diamond-like carbon film.

3. The fingerprint detection device according to the claim 2, wherein said diamond-like carbon film includes carbon and hydrogen.

4. The fingerprint detection device according to the claim 2, wherein said diamond-like carbon film includes carbon, hydrogen, and nitrogen.

5. The fingerprint detection device according to the claim 2, wherein said diamond-like carbon film has a thickness in the range from 0.2 to 5.0 micrometers.

6. The fingerprint detection device according to the claim 5, wherein said diamond-like carbon film has a thickness in the range from 0.5 to 2.0 micrometers.

7. The fingerprint detection device according to the claim 2, wherein said diamond-like carbon film has a hardness of at least 10 Gpa.

8. The fingerprint detection device according to the claim 7, wherein said diamond-like carbon film has a hardness of approximately 20 GPa.

9. The fingerprint detection device according to claim 4, wherein said diamond-like carbon film has a growth temperature at or below 250° C.

* * * * *